United States Patent
Boshev et al.

(10) Patent No.: US 11,687,565 B2
(45) Date of Patent: Jun. 27, 2023

(54) ASYNCHRONOUS DATA REPLICATION IN A MULTIPLE AVAILABILITY ZONE CLOUD PLATFORM

(71) Applicant: SAP SE, Walldorf (DE)

(72) Inventors: Stoyan Zhivkov Boshev, Sofia (BG); Stoyan Ivanov Veleshki, Sofia (BG); Nikolay Georgiev Kabadzhov, Sofia (BG); Diyan Asparuhov Yordanov, Sofia (BG); Plamen Marianov Peev, Sofia (BG)

(73) Assignee: SAP SE, Walldorf (DE)

( * ) Notice: Subject to any disclaimer, the term of this patent is extended or adjusted under 35 U.S.C. 154(b) by 57 days.

(21) Appl. No.: 17/208,558

(22) Filed: Mar. 22, 2021

(65) Prior Publication Data
US 2022/0300531 A1    Sep. 22, 2022

(51) Int. Cl.
*G06F 16/23*    (2019.01)
*G06F 16/25*    (2019.01)
(Continued)

(52) U.S. Cl.
CPC .......... *G06F 16/273* (2019.01); *G06F 11/203* (2013.01); *G06F 16/2343* (2019.01); *G06F 16/2365* (2019.01); *G06F 16/256* (2019.01)

(58) Field of Classification Search
CPC ............... G06F 16/273; G06F 16/2343; G06F 16/2365; G06F 16/256; G06F 11/203
See application file for complete search history.

(56) References Cited

U.S. PATENT DOCUMENTS 8,078,922 B2    12/2011    Yordanov et al.
8,527,992 B2    9/2013    Dokovski et al.
(Continued)

OTHER PUBLICATIONS

Sebbah et al. Availability Optimization in Cloud-Based In-Memory Data Grids. In: Rueher, M. (eds) Principles and Practice of Constraint Programming. CP 2016. Lecture Notes in Computer Science(), vol. 9892. Springer, Cham, https://doi.org/10.1007/978-3-319-44953-1_42; p. 666-679 (Year: 2016).*
(Continued)

*Primary Examiner* — Dennis Truong
(74) *Attorney, Agent, or Firm* — Fish & Richardson P.C.

(57) ABSTRACT

The present disclosure relates to computer-implemented methods, software, and systems for managing asynchronous data replication in a multiple availability zone cloud environment. Metadata for files for asynchronous replication at a second availability zone is stored at an in-memory data grid of a first instance of a storage service at a first availability zone at a multiple availability cloud platform that provides storage services. The in-memory data grid includes a queue data structure of metadata records and a map of metadata records. In response to determining that connection from the first availability zone to the second availability zone is available, asynchronous data replication for files identified at the map is executed. A file for replication is identified at the map and provided for replication at a second file storage at the second availability zone through a replication interface of a second instance of the storage service at the second availability zone.

17 Claims, 14 Drawing Sheets

(51) Int. Cl.
*G06F 11/20* (2006.01)
*G06F 16/27* (2019.01)

(56) References Cited

U.S. PATENT DOCUMENTS

| | | | |
|---|---|---|---|
| 9,432,398 B2 | 8/2016 | Iliev et al. | |
| 9,558,206 B2* | 1/2017 | Molaro | G06F 16/184 |
| 9,602,521 B2 | 3/2017 | Iliev et al. | |
| 9,826,035 B2 | 11/2017 | Genevski et al. | |
| 10,275,346 B2 | 4/2019 | Boshev et al. | |
| 10,474,547 B2 | 11/2019 | McAlister et al. | |
| 10,528,624 B2 | 1/2020 | Boshev | |
| 11,288,138 B1* | 3/2022 | Freilich | G06F 11/1451 |
| 11,314,717 B1* | 4/2022 | Certain | G06F 16/2308 |
| 2013/0339301 A1* | 12/2013 | Saito | G06F 16/27 |
| | | | 707/649 |
| 2014/0244954 A1* | 8/2014 | Amrhein | G06F 3/0683 |
| | | | 711/162 |
| 2017/0235645 A1* | 8/2017 | Theimer | G06F 21/6218 |
| | | | 707/634 |
| 2022/0019350 A1* | 1/2022 | Karr | G06F 3/0617 |
| 2022/0147541 A1* | 5/2022 | Mallipeddi | G06F 3/0619 |

OTHER PUBLICATIONS

Didona, Diego, et al. "Transactional auto scaler: Elastic scaling of replicated in-memory transactional data grids." ACM Transactions on Autonomous and Adaptive Systems (TAAS) 9.2 (2014): 1-32. (Year: 2014).*

Kisley, Richard Victor. "Apparatus and system for asynchronous replication of a hierarchically-indexed data store." U.S. Pat. No. 7,398,285. Jul. 8, 2008. (Year: 2008).*

U.S. Appl. No. 17/067,223, filed Oct. 9, 2020, Boshev.
U.S. Appl. No. 17/068,245, filed Oct. 12, 2020, Boshev.
U.S. Appl. No. 17/098,618, filed Nov. 16, 2020, Boshev et al.
U.S. Appl. No. 17/169,754, filed Feb. 8, 2021, Yousouf et al.
U.S. Appl. No. 17/169,787, filed Feb. 8, 2021, Yousouf et al.
U.S. Appl. No. 17/170,105, filed Feb. 8, 2021, Yousouf et al.
U.S. Appl. No. 17/170,166, filed Feb. 8, 2021, Yousouf et al.
U.S. Appl. No. 17/208,496, filed Mar. 22, 2021, Boshev et al.

* cited by examiner

ASYNCHRONOUS DATA REPLICATION IN A MULTIPLE AVAILABILITY ZONE CLOUD PLATFORM

The present disclosure relates to computer-implemented methods, software, and systems for data processing in a cloud environment.

BACKGROUND

Software complexity is increasing and causes changes to lifecycle management and maintenance of software applications and platform systems. Customer's needs are transforming, with increased requests for flexibility in terms of processes and landscapes, and also high availability to access software resources provided by the underlying platform infrastructure. When an application or application service is running, they can consume resources from a file storage through execution of operations, such as a read operation, a write operation, and an edit operation, among others. When these applications and services execute, they may read and write data from the file storage where one or more file records reside. A failure in the data synchronization processes may cause disruptions when providing services by the software applications and reduction in their availability and performance.

SUMMARY

The present disclosure involves systems, software, and computer implemented methods for managing data replication in a cloud environment including multiple availability zones. The data replication can be executed synchronously and/or asynchronously to address different conditions determined for the connectivity between the availability zones of the cloud environment.

In a first aspect, one example method may include operations such as receiving a request associated with storing content of a file at a storage service provided by a multiple availability zone cloud platform; in response to receiving the request, sending a lock request through a persistence interface to an in-memory data grid at a first instance of the storage service to lock the file for accessing; receiving, at the persistence interface, an input stream including the content of the file based on the request, wherein receiving the input stream includes: iteratively reading the input stream in portions; and iteratively storing, by the persistence interface, a read portion for the file in a first file system storage associated with instances of the storage service at a first availability zone, wherein during storing the read portion, the file is locked for accessing; in response to storing a portion of the file, providing, through the persistence interface, the stored portion of the file to a replication executor at the first instance of the storage service, wherein each portion is provided to the replication executor to request replication of read and stored portions of the content of the file from the input stream into a second file storage of a second availability zone of the multiple availability zone cloud platform; determining a mode of replication for executing transfer of portions of the input stream from the replication executor at the first instance of the storage service running at the first availability zone to a replication interface at a second instance of the storage service running at the second availability zone; and in response to determining that the mode of replication is synchronous, providing, by the replication executor, a request to store a stored portion of the input stream by the persistence interface of the first instance of the storage service at the first availability zone to the replication interface of the second instance of the storage service, wherein the request is to store the read and stored portion at the second file storage of the second availability zone.

In some instances, the request can be from a user. The request can be received at the persistence interface instantiated at the first instance of the storage service, where the first instance of the storage service is running at the first availability zone of the multiple availability zone cloud platform. In some instances, the user can be associated with instances running at the first availability zone as primary storage service instances, where the multiple availability zone cloud platform includes at least two availability zones. In some instances, the storage service can be executed with at least two instances at each of the availability zones, and the storage service can provide bi-directional replication between instances running at the multiple availability zones to maintain synchronized content at corresponding file storages.

In some instances, storing content can include at least one of adding, updating, modifying of content of the file.

In some instances, the example method of the first aspect can include: receiving a delete request associated with the file at a first instance of the storage service provided at the first availability zone of the multiple availability zone cloud platform; in response to receiving the delete request, sending a lock request through the persistence interface to the in-memory data grid at the first instance of the storage service to lock the file for accessing; sending an instruction for execution of a delete operation to delete the file at the first file storage; and sending a request, by the replication executor, to the replication interface of the second instance of the storage service at the second availability zone to delete the file at the second file storage; and in response to determining that deleting at the second file storage is executed successfully, sending a delete request to the in-memory data grid at the first instance of the storage service to delete metadata stored for the file.

In some instances, the stored portion of the file can be provided to the replication executor for replication at the second availability zone in parallel to reading a subsequent portion of the input stream by the persistence interface.

In some instances, the persistence interface can be an application programming interface (API) implemented at the first instance of the storage service. The request can be dispatched for receiving by the first instance of the storage service based on load balancing rules defined for the multiple availability zone cloud platform.

In some instances, the example method of the first aspect can include: in response to determining that the mode of replication is synchronous on each iteration, providing iteratively each of the portions of the input stream to the replication interface of the second instance of the storage service to replicate the stored content at the first file storage of the first availability zone to the second file storage of the second availability zone.

In some instances, in response to determining that a provided portion for replication at the second file storage failed to be replicated, an asynchronous mode of replication can be configured for a subsequent iteration for data transfer from the first instance of the storage service at the first availability zone; and reading and storing subsequent portions of the file to store the content of the file at the first file storage at the first availability zone; and storing metadata for the file that is stored at the first file storage at the first availability zone, wherein the metadata is stored at the in-memory data grid of the first instance of the storage service, wherein the in-memory data grid of the first instance of the storage service is synchronized with in-memory data grids at other instances of the storage service running at the multiple availability zones cloud platform.

In some instances the example method of the first aspect can include: in response to determining that the mode of replication is changed to synchronous from a previous asynchronous mode: reading the stored metadata for the file; locking the file for accessing by creating a lock record for the file at the in-memory data grid at the first instance of the storage service; reading the stored file at the first file storage; and replicating the file at the second file storage at the second availability zone by providing the file to the replication interface of the second instance of the storage service at the second availability zone, wherein the mode of replication is changed to synchronous mode in response to successful replication of at least a portion of stored changes for replication during the asynchronous mode.

In some instances, the in-memory data grid stores the metadata in a queue data structure, where data from the data grid is read in a first-in-first-out mode.

Other implementations of this first aspect include corresponding systems, apparatus, and computer programs, configured to perform the actions of the methods, encoded on computer storage devices.

In a second aspect, an example method for managing asynchronous data replication in a multiple availability zone cloud environment can include: storing metadata for one or more files for asynchronous replication at a second availability zone, wherein the metadata is stored at an in-memory data grid of a first instance of a storage service at a first availability zone, wherein the first and the second availability zones are included in a multiple availability cloud platform providing storage services, wherein the in-memory data grid includes a queue data structure of metadata records and a map of metadata records, wherein the queue data structure includes one or more records corresponding to one or more operations executed on a file to define versions of the file from the one or more files for replication from the first availability zone to the second availability zone, wherein a record from the queue data structure includes metadata for a corresponding request for storing content for a file, and wherein the map of metadata records identifies the files that are associated with requests for storing content that are not replicated at the second availability zone of a multiple availability zone cloud platform; in response to determining that connection from the first availability zone to the second availability zone is available, executing asynchronous data replication for files identified at the map, wherein the execution includes: determining a file for replication that is identified at the map; reading the stored metadata for the file for replication from the queue data structure to determine a replication operation based on one or more records identified for the file for replication at the queue data structure; reading, by a replication executor at the first instance of the storage service, the file from a first file storage; and providing for replication, by the replication executor at the first instance of the storage service, the file at a second file storage at the second availability zone by providing the file to a replication interface of a second instance of the storage service at the second availability zone.

In some instances, in response to determining the file for replication, the file can be locked for accessing by creating a lock record for the file at the in-memory data grid at the first instance of the storage service.

In some instances, the one or more files for replication can include a file that is received at a first instance of a storage service at the first availability zone.

In some instances, the replication can be determined to be performed asynchronously at a replication agent included in the replication executor based on evaluation of metadata stored at the in-memory data grid.

In some instances, metadata stored at the in-memory data grid can be read iteratively to determine a record from the records stored at the queue and associated with a file for replication, wherein the record corresponds to the replication operation to be executed for the asynchronous data replication of the file.

In some instances, the replication of the file by the replication executor can be performed in portions read from the file from the first file storage and stored in portions at the second file storage at the second availability zone.

In some instances, the metadata stored in the in-memory data grid can be updated iteratively while evaluating the data to determine the replication operation to be executed.

In some instances, the one or more operations includes an operation of an operation type selected from the group of adding, updating, modifying, and deleting of the file, and wherein a version of a file corresponds to an operation type Other implementations of this aspect include corresponding systems, apparatus, and computer programs, configured to perform the actions of the methods, encoded on computer storage devices.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
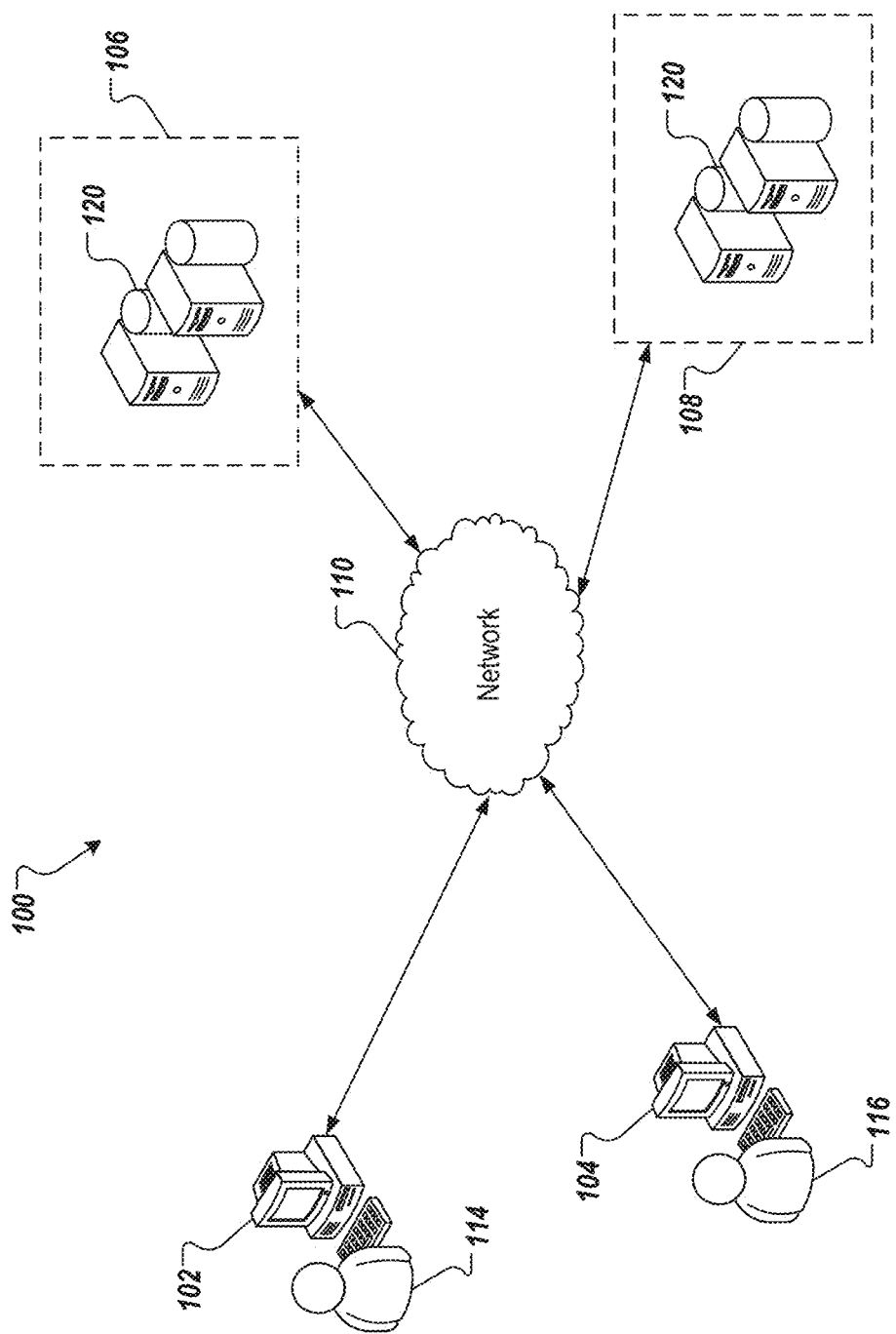
FIG. 1 illustrates an example computer system architecture that can be used to execute implementations of the present disclosure.

The present disclosure describes various tools and techniques for managing data replication in a cloud environment including multiple availability zones. The data replication can be executed at one availability zone in a synchronous or an asynchronous mode, where the data is initially stored at another availability zone. The execution of the data storage and replication can be performed by a storage service provided with multiple instances running at different availability zones of the cloud environment.

In some instances, a cloud platform may include multiple availability zones (AZ) where users can distribute instance nodes of applications to provide high availability of the services provided by the applications. Since an application can be executed at different instance nodes, risks of failure to provide services through the application due to a downtime can be reduced.

In some instances, a cloud environment may be configured to include multiple AZs, where one application or service may include multiple instances running in multiple different AZs. The multiple AZs may share resources of the cloud platform, and may be accessible from the outside through the same address, for example, the same uniform resource locator (URL). Cloud computing resources may be provided in high availability data center facilities that may represent the different AZs. In general, each AZ can represent an independent data center associated with its own hardware which is connected to other AZs through a network connection, for example, a fast fiber optical connection.

To provide additional scalability and reliability, the data centers (AZs) may be located in different physical locations. In some instances, the AZs can be defined as distinct locations and thus are isolated, which also facilitates isolation from failures at the different AZs. For example, a network connectivity failure that may be experienced at one data center representing one AZ may not affect another data center representing another AZ. By executing applications, services, databases, and other examples of entities that can run on cloud platform in a multiple AZ setup, high availability for provided services and data is maintained. Maintaining a cloud platform with multiple AZs supports providing low-latency network connectivity between different instances of applications executed at multiple zones.

In some instances, when an application and/or an application service that is running on a multiple AZ cloud platform is accessed by a user and services are requested, it can be accessed through a single access address (e.g., URL). The request can be processed at any one of the AZs, thus if one instance of the application and/or the application service is running at an AZ that is down (e.g., non-operational), another instance running on an operational AZ can process the received request. Thus, even if the cloud platform experiences some outages at some of the data centers where the platform is running, services can be provided to users and operations can be not affected.

In some instances, maintaining high availability provided by core services of a cloud platform that is unaffected in cases when some of the platform's data centers experience issues or outages can be associated with challenges to maintain a highly reliable disaster recovery procedure and low (close to zero) recovery latency.

In some instance, a storage service is a core service provided by a cloud platform that can be used to manage files stored at the cloud platform. In some instances, the storage service can be associated with storing and managing artifacts, for example, binary files, installation files, configuration files, and other example files associated with executed services at the cloud platform. In some cases, the storage service can accept requests (e.g., from user that are clients of the cloud platform) for storing artifacts in association with deploying client's application on the cloud platform. In some other cases, the storage service may accept requests from users that are administrators of the cloud platform. Such requests may be associated with storing platform artifacts related to platform provided service that are deployed on the cloud platform and consumed by end-users (e.g., directly or through user-defined applications deployed on the cloud platform). In some instances, the storage service can accept write requests and can store provided data (including modifications to a file, or a file as a whole) on a file system storage of the cloud platform. The file system storage may be implemented to include distinct instance of the storage for the different AZs, where those instances are synchronized among each other to store equal or corresponding content.

In some instances, providing reliable storage services from a multiple AZ cloud platform is associated with maintaining data replication between file system storages located at different multiple AZs. In some instances, to support data replication between file system storages at different AZs and in relation to a storage service provided by the cloud platform, tools and techniques can be implemented at the instances of the storage service that run at the different AZs to manage data replication that guarantees close to zero data loss as a recovery point objective measure and near zero recovery latency objective. In some instances, the replication can be performed bi-directionally, which means that when data is stored through one instance of a storage service at one AZ, the data is replicated to the other AZs, and vice versa—when data is stored at any one of the other AZs, it is replicated at the first AZ.

In some instances, when content for a file is received at one instance of a storage service for storing the content at a first file system storage of a first AZ, replication to file system storages at another AZ can be performed simultaneously with the reading and storing of the content of the file. In some instances, the content of the file can be received through an input stream that can be processed in portions, where once a portion is read and stored at one AZ, that portion can be provided for replication at another AZ. In some instances, the replication can be performed with a very small delay, as storing of a portion i at the second AZ can overlap with storing a portion i+1 at the first AZ. Thus, the difference between time points when the content of the file is stored at the first AZ and at the second AZ can be close to an average time period necessary to complete storing of a single portion of the file.

In some instances, a cloud platform may experience disruptions in the network connectivity. For example, a disruption may be caused by a failure in the underlying hardware and/or infrastructure where the cloud platform is hosted. The disruptions may affect the cloud platform, either in part or as a whole. In some instances, the disruptions may affect some or all connection types associated with the cloud platform. In some instances, the disruption may be associated with issues that affect one data center of the cloud platform. The disruption may affect connectivity between AZs and performance of operations that affect the cloud platform as a whole. In some instances, if synchronization of data is not maintained, disruption of connectivity can affect accuracy of executed services. For example, based on a network connectivity issue, a determination based on responses from different AZs of the cloud platform may lead to false results if the data stored between at file system storages at the different AZs is not synchronized.

In some instances, a data replication method can be implemented at the storage service that manages continuous replication based on an implemented replication executor that can work in both synchronous and asynchronous mode. In some instances, the replication can be configured to correspond to a particular mode—synchronous or asynchronous—based on the status of the connectivity between the different AZs. The replication mode may be adjustable based on determination of whether there are connectivity issues between the different AZs of the cloud platform. In some instances, in response to determining that the connectivity between those is operational, the synchronization can be performed according to operations defined for a synchronous mode. In some instances, in response to determining that connectivity between at least two AZs is not operational (e.g., there is a network connectivity outage), the replication can be executed according to operations configured for executing replication in an asynchronous mode.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

In some instances, the cloud environment 106 and/or the cloud environment 108 can be configured in a multiple AZ architecture. The cloud environment 106 may be configured to include multiple AZs where one application or service may include multiple instances running in corresponding multiple AZs. In the cloud environment 106, an service may be running at one of the cloud environments to provide end-user services, which can include, for example, services associated with requests sent through the network 110 from user 114 (or user 116) over device 102 (or device 104). The applications and the databases that are running in the cloud environment 106 may be designed, developed, executed, and maintained in relation to different customers and based on configured accounts that define process execution in relation to the applications and the database.

In some instances, the cloud environments 106 and/or 108 can host applications, service, databases, other, which are associated with different customers and/or accounts and may be configured to interact in a particular way.

Figure 2:
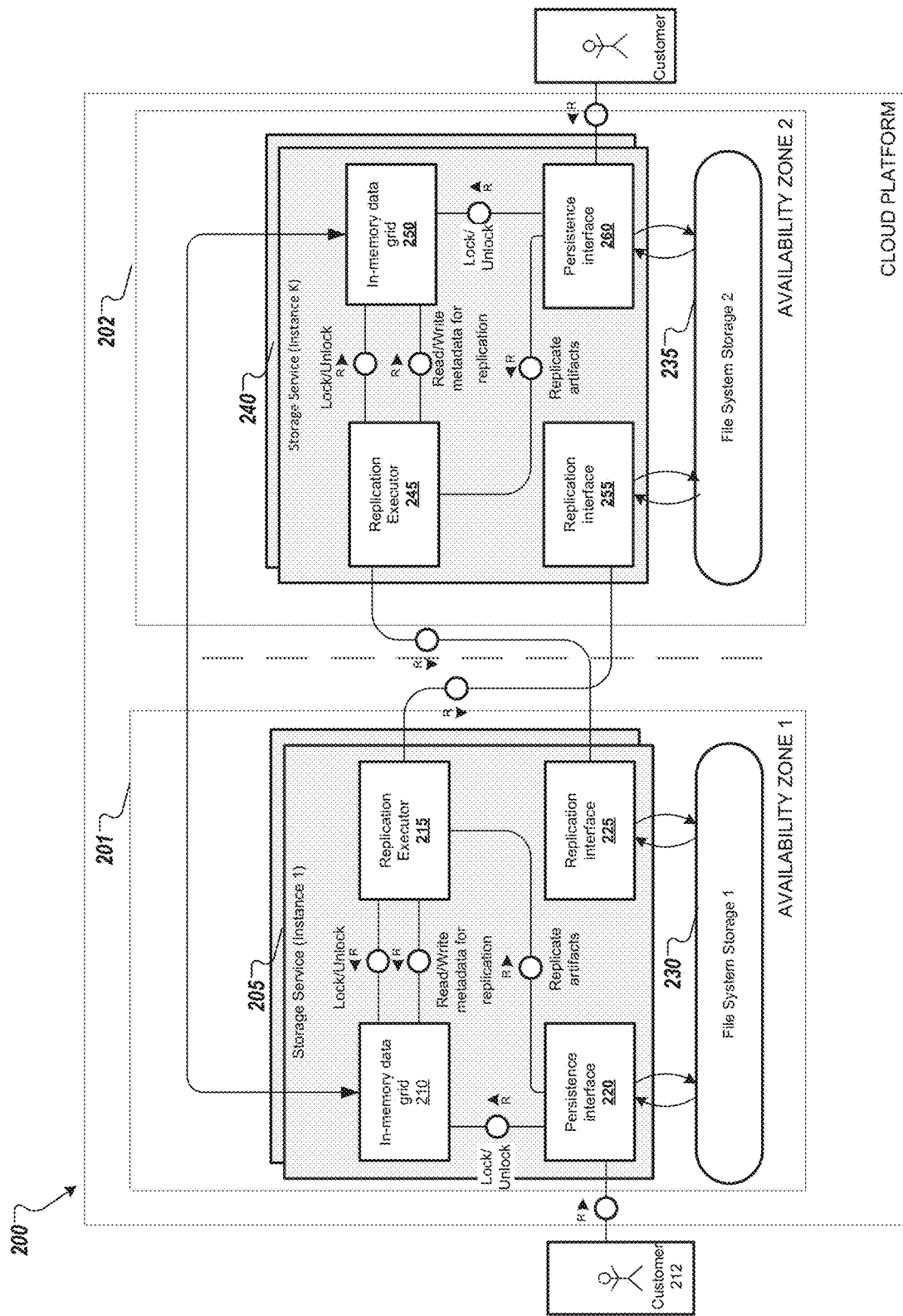
FIG. 2 is a block diagram for an example cloud platform environment including a storage service running at multiple availability zones that are provided with tools and techniques to manage data replication between different storages at the different zones in accordance with implementations of the present disclosure.

FIG. 2 is a block diagram for an example cloud platform environment 200 including a storage service running at multiple AZs that are provided with tools and techniques to manage data replication between different storages at the different zones in accordance with implementations of the present disclosure.

In some instances, the cloud platform 200 may be similar to the cloud environment 106 and/or the cloud environment 108 of FIG. 1. The cloud platform 200 can include multiple AZs (only two presented on FIG. 2). In some instances, the multiple AZs can be defined as multiple data centers that can execute multiple instances of a single service, such as a storage service to serve requests (e.g., from end-users and/or through applications or services invoking logic running on the cloud platform) for storing content at file system storages.

In some instances, the cloud platform 200 include a first AZ (AZ1) 201 and a second AZ (AZ2) 202. In some instances, the cloud platform 200 provides services to store artifacts (or files) at a persistence storage. The cloud platform 200 implements a storage service that is executed with multiple instances that are run at the two AZs (or more but not shown on FIG. 2). In some instances, one instance of the storage service can be run at each AZ. In some other instances, to provide improved reliability and responsiveness of execution of operations, the storage service may be deployed with at least two instances at each of the two AZs.

In some instances, the storage service includes a first instance of the storage service 205 running at the AZ1 201 and a second instance of the storage service 240 at AZ2 202. In some instances, a customer (for example, customer 212) may communicate with the storage service through a first instance of the storage service 205. For example, the customer 212 can send a write request to store or modify content of a file.

In some instances, the storage service may store content of files at a persistence store that runs with multiple instances at corresponding AZs. The persistence store can include "File System Storage 1" 230 at the AZ1 201 and the "File System Storage 2" 235 at AZ2 202 as two instances of the persistence store that maintain separate copies of the persisted files and/or content by the storage service. The first instances of the storage service 205 is associated with the first instance of the persistence storage—"File System Storage 1" 230, and the second instance of the storage service 240 is associated with the second instance of the persistence storage, "File System Storage 2" 235.

In some instances, a write request can be received at AZ1 (for example, as a primary AZ for customer 212). The write request can be associated with storing content of a file at the cloud platform 200. In response to the received request, the requested content for storing can be stored at a corresponding instance of the persistence storage at the AZ where the request is processed, i.e., AZ1 201, and at "File System Storage 1" 230. In some instances, the content can be replicated to other AZs, for example, to AZ2 202 to maintain synchronized storage of files at both availability zones (e.g., having corresponding content). In some other cases, when content for storage is provided to the second instance of the storage service 240 at the AZ2 202, that content can be also replicated to the AZ1 201. The second instance of the storage service 240 receives content from the replication executor 215 at a replication interface 255 that communicates with the "File System Storage 2" 235 to store the received content. Correspondingly, the first instance of the storage service 205 has a replication interface 225 that can receive content provided by other instances, for example, the second instance of the storage service 240, for replicating content.

In some instances, the storage service may be implemented to handle continuous replication by including a replication executor that can handle synchronization between the persistence stores at different AZs. In some instance, an instance of the storage service, such as the first instance of the storage service 205 is provided with an instance of the replication executor (i.e, replication executor 215). In some instances, storage service instance run at different AZs can have corresponding instance of a replication executor. The second instance of the storage service 240 includes the replication executor 245 as a corresponding instance.

In some instances, the replication executor can handle synchronization between stored data at different instances of the storage service at different AZs in a different manner based on considerations of the connectivity status between the different AZs. In some instances, the replication executor may have implemented logic to handle synchronization in a synchronous mode (e.g., AZ1 and AZ2 can establish connection) and in an asynchronous mode (e.g., AZ1 and AZ2 experience connection issues and/or outages).

In some instances, a synchronous mode for data replication can be performed in response to determining that the AZs—AZ1 201 and AZ2 202—are operational (work) and there are no connectivity issues between them. In other instances, an asynchronous mode for data replication can be performed in response to determining that at least one of the AZs is not operations (not working) and/or that there is a connectivity issue between the AZs.

In some instances, when a request for storing content by a storage service is received, the request can be processed by one instance of the storage service, for example, the first instance of the storage service instance 205. The request can be processed at a persistence interface 220. In some instances, the persistence interface 220 can be an application programming interface (API) that can receive an input stream from the customer 212 and process that input stream in portions, then storing the portions in the "File System Storage 1" 220. In some instance, the persistence interface 220 can also store metadata related to the file associated with the request, to lock the file for accessing so that the file is not read, modified, or otherwise accessed, while the persistence interface is reading and storing the file.

In some instances, the second instance of the storage service 240 (and any other instance of the storage service) is also provided with a corresponding persistence interface 260 that receives requests and communicates with an in-memory data grid 250 and a replication executor to provide read and stored content to another instance at another AZ to synchronize the content at the corresponding persistence stores (e.g., file system storage). In some instances, the in-memory data grid 250 can be implemented as a Java-based in-memory data grid, such as HAZELCAST IMDG. In some instances, the in-memory data grid 250 can be implemented as a data grid that provides central, predicable scaling of applications through in-memory access to frequently used data through an elastically scalable data grid. In those example, querying the in-memory data grid may be executed with improved speed and with reduced load for the searching procedure.

In some instances, in response to receiving a request to store content of a file and determining that the data replication can be executed in a synchronous mode, the content of the file can be stored at the "File System Storage 1" 220 and at the same time (or substantially the same) and/or in parallel, the content for the file from the request can be sent from the persistence interface 220 through the replication executor 215 to the second instance of the storage service 240 at the AZ2 202. In some instances, the second instance of the storage service 240 at the AZ2 202 can receive the re-sent content at a replication interface 255 and store the received content at the "File System Storage 2" 235.

In some instances, when content from a request from the first instance of the storage service 205 is re-sent to the second instance of the storage service 240, the content can be processed in portions and read portions at the first instance can then be sent for storage at the second instance without awaiting the complete processing of the provided content associated with the request. In those case, performing of the storage at the two AZs based on a content received at one instance of a storage service at one AZ is done almost in parallel. In some instances, the time needed to perform the storage based on the request in the different stores has a tiny difference (e.g., few milliseconds delay), and thus performance of the storage service is maintained at a high level. Since the synchronization between the two stores 230 and 235 is performed faster and more efficiently using this solution, requests received at the second instance of the storage service 240 can also be performed faster and provide higher service quality. For example, the "File System Storage 2" 235 can be provided with content of a file that was created and/or modified through an instance of the storage service at a different AZ faster than before, and requests received at the second instance of the storage service 240 associated with that file can be processed faster and without delay to await replication (and synchronization).

In some instance, a connectivity issue between the two AZs can be determine that may not allow the synchronous mode of data replication to be performed. For example, the connectivity issue may be associated with a network outage or a failure in one of the AZs. In those cases, requests received at one AZ that is still operational can be processed in an asynchronous mode for data replication. In asynchronous mode, if a request to provide content is processed at the AZ1 (e.g., received request at persistence interface 220 of the first instance of the storage service 205 and executing corresponding writing operations in the "File System Storage 1" 230) but parallel synchronizing of content associated with the request to another AZ cannot be accomplished, then Replication Executor 215 can write metadata to an in-memory data grid 210. For example, the synchronization of content with another AZ may be determined as failed in cases where a request from the replication executor 215 to the replication interface 255 has failed. The in-memory data grid 210 can include a data structure that can store metadata storing information regarding which data entity (e.g., identification of a file) has to be replicated (e.g., perform a write or delete operation for the identified data entry). The data structure can be stored into the in-memory data grid 210, to which all instances of the storage service can have access, as the grid 210 can be shared such that all AZs can have access to the data. In some instances, the data in the in-memory data grid 210 can be synchronized with the data at other in-memory data grids (e.g., in-memory data grid 250) at other AZs.

In some instances, the in-memory data grid 210 can be used to store metadata for files (or artifacts) that are stored at the "File System Store 1" 230 and replicated at other stores at other AZs. In some instances, the in-memory data grid 210 can also store data to define which of the files that are stored and are about to be replicated are also locked or protected from change during the replication. In some instances, the in-memory data grid 210 can store metadata to indicate that a file is locked and cannot be accessed (e.g., for review, for writing, for modifying, or other purpose) while the replication is still ongoing and has not been completed.

In some instances, when the replication is performed in an asynchronous mode and it is determined that the connection between AZs is restored, the replication executor 215 can start to replicate files one by one. In some instances, before executing replication of each file from the first instance of the storage service 205 to the second instances of the storage service 240, a lock on that file can be defined at the in-memory data grid 210 of the first instances. In some instances, if the file is replicating through the replication executor 215 and at the same time a write request is received at the persistence interface 220 (e.g., from the user), then the request can be put on hold to wait until replication is completed. In some other instances, the opposite situation can be also possible. That is, if the write request is processed at the persistence interface 220, then replication executor 215 can be configured to wait until the persistence interface 220 unlocks that file. In some instances, defining a lock on a file, determining whether a file is locked, removing a lock from a file, or other operations associated with defining locks on files, can be performed through communication with the in-memory data grid 210. The in-memory data grid 210 may store and organize metadata to keep a record of the status of a file (e.g., is it currently locked, who locked it, time stamp, etc.).

In some instances, when a request is received at the persistence interface 220, an input stream can be provided to the persistence interface 220 including content for a file. The input stream can be read in portions that can each be iteratively stored at the "File System Store 1" 230, and a read and stored portion can be provided for replication in parallel to a subsequent read and store operation executed by the persistence interface 220 for a subsequent portion of the input stream. Further details for the execution of processing of the input stream in portions and the parallel replication are provided in the description for FIGS. 3 and 4.

Figure 3:
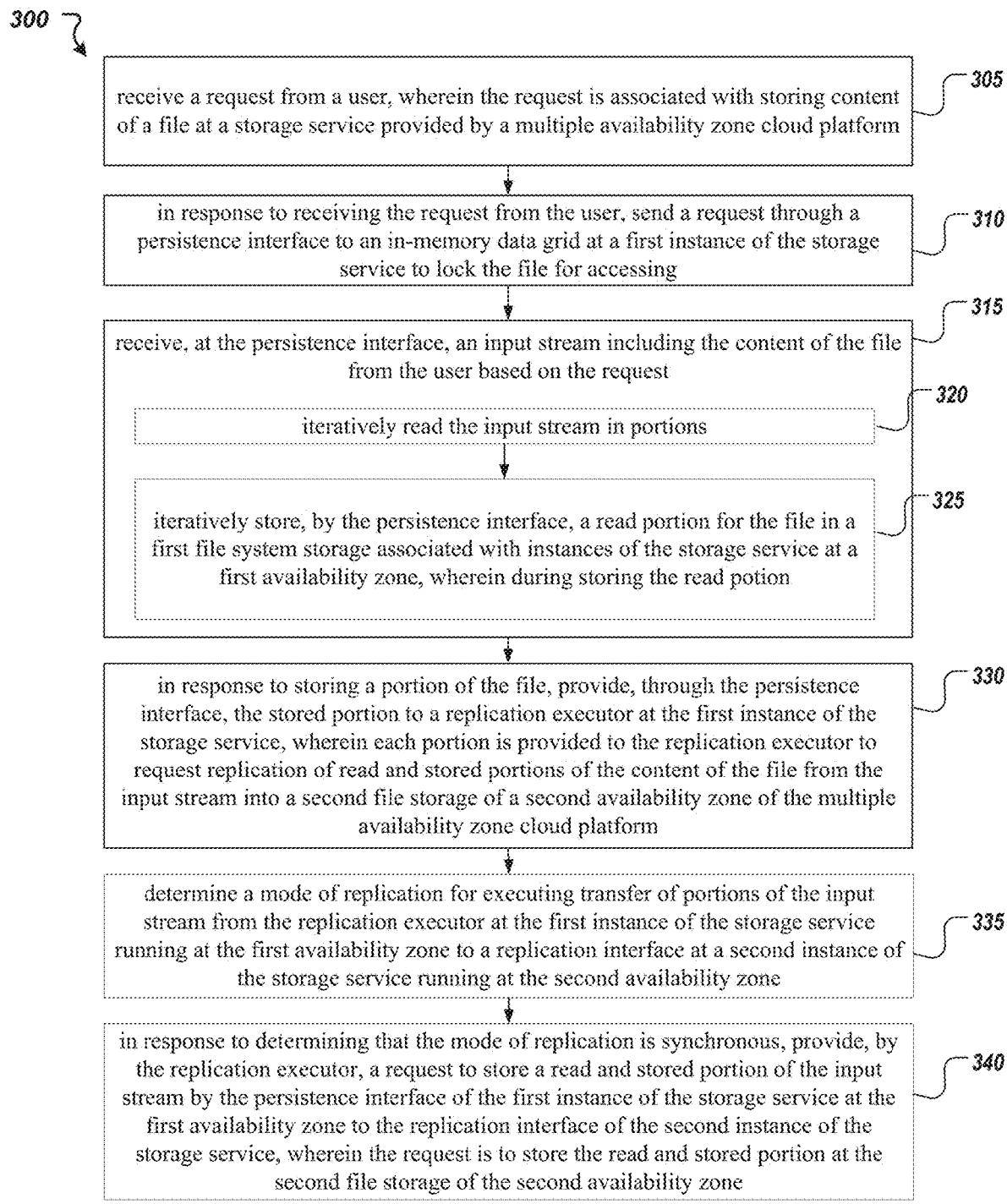
FIG. 3 is a flowchart for an example method for managing data replication in a cloud environment including multiple availability zones in accordance with implementations of the present disclosure.

FIG. 3 is a flowchart for an example method 300 for managing data replication in a cloud environment including multiple AZs in accordance with implementations of the present disclosure.

In some instances, applications, services, database, among other entities that can be hosted in a cloud environment, may provide services for consumption within a cloud platform or outside of the cloud platform. Entities running on the cloud platform may execute logic that includes processing received requests and providing resources or data, dispatching received requests to other entities, querying database entities, and accessing external resources to gather data or to request services, among other examples of implemented processing logic at running entities on the cloud platform. For example, an application may execute processes and access a storage (e.g., file system storage) to provide services to end-users. The example method 300 may be executed at a cloud platform that may be configured to implement logic for executing data replication to maintain consistency between file system storages at different AZs of the cloud platform. The logic can be implemented into the storage service and can correspond to or be substantially equivalent to the implementations discussed in association of the storage service instances 205 and 240 described in FIG. 2. In some instances, the cloud platform can be similar to the cloud platform 200 of FIG. 2, and the first instance of a storage service and the second instance of the storage service can be similar to the first and second instance of the storage service 205 and 240 of FIG. 2, where each of those instances store received content for files at corresponding storages similar to the file system storage described at FIG. 2.

At 305, a request is received. The request can be associated with a request to store content of a file at a storage service provided by a multiple AZ cloud platform. The request can be received from a user or from an application and/or service. The request can be received at an instance of the storage service that is running at a first AZ of the cloud platform. In some instances, the request can be received at the first instance of the storage service 205 of FIG. 2 that is running on the cloud platform 200. In some instances, the user can be associated with instances running at the first AZ as primary storage service instances. In some instances, the multiple AZ cloud platform includes at least two AZs, and the storage service can be executed with at least two instances at each of the AZs to provide higher availability of store services.

In some instances, when a request is received at an instance of the storage service at the first AZ, the stored content is replicated at other AZs. In some instances, the storage service can provide bi-directional replication between instances running at the multiple AZs to maintain synchronized content at corresponding file storages.

In some instances, the request to store content can include at least one request, such as a request to add, update, and modify content of the file associated with the request. For example, the request can store an installation file, to add further configuration data to an existing configuration file, to modify existing content of a configuration file, to update in part or as a whole the content of a file, to update to replace a portion and/or to add a new portion and/or to modify a portion, to update a format of a file, among other examples of storing content related to a file.

At 310, in response to receiving the request, a request is sent through a persistence interface to an in-memory data grid at a first instance of the storage service to lock the file for accessing. In some instances, the persistence interface can be similar to the persistence interface 220 of FIG. 2.

In some instances, the request at 305 is received at the persistence interface, where the persistence interface is an application programming interface (API) implemented at the first instance of the storage service. The request can be dispatched for receiving by the first instance of the storage service based on load balancing rules defined for the multiple AZ cloud platform, and, for example, for the first AZ cloud platform. In some instances, an AZ corresponding to the request may be determined based on location considerations between the location of the requestor and the proximity to the location of the execution of the AZ as a data center. In some more instances, a request for storage services that is associated with the first AZ can be dispatched to a given instance of a storage service based on load balancing criteria for equal or close to equal distribution of processing requests for storing.

At 315, an input stream including the content of the file based on the request is received. The input stream can be received at the persistence interface. In some instances, receiving the input stream includes operations 320 and 325.

At 320, the input stream is iteratively read. At 325, a read portion of the input stream is stored at a first file system storage associated with instances of the storage service at the first AZs. In some instances, the first file system storage corresponds to the "File System Storage 1" 230 of FIG. 2 and is associated with the first instance of the storage service that is part of the instances at AZ1 (e.g., AZ1 201 of FIG. 2). In some instances, during storing the read portion at the first file system, the file is locked for accessing. In some instances, in order to lock the file for accessing, the persistence interface can communicate with an in-memory data grid and create a record in a data structure that maintain information for stored files at the cloud platform. In some instances, the in-memory data grid can be similar to the in-memory data grid 210 of FIG. 2.

At 330, in response to storing a portion of the file, the stored portion is provided through the persistence interface to a replication executor at the first instance of the storage service for replication to another AZ storage. In some instances, the replication executor can be similar to the replication executor 215 of FIG. 2, and the stored portion can be provided from the replication executor to a replication interface at a second instance of the storage service running at a second AZ. In some instances, a read and stored portion from the input stream can be provided through the replication executor to request replication of read and stored portions into a second file storage of the second AZ of the multiple AZ cloud platform.

In some instances, a stored portion can be provided to the replication executor from the persistence interface for replication at the second AZ in parallel to reading a subsequent portion of the input stream by the persistence interface.

At 335, a mode of replication can be determined for executing a transfer of portions of the input stream from the replication executor at the first instance of the storage service running at the first AZ to a replication interface at a second instance of the storage service running at the second AZ. In some instances, the mode of replication can be determined as synchronous or asynchronous.

At 340, in response to determining that the mode of replication is synchronous, a request to store a read and stored portion of the input stream by the persistence interface of the first instance of the storage service at the first AZ is provided (by the replication executor) to the replication interface of the second instance of the storage service. The request can be defined for storing the portion at the second file storage of the second AZ. In some instances, the request to store the already read and stored portion can be sent in parallel to further processing of subsequent portions of the input stream at the persistence interface 220. In some cases, the replication to another AZ can be performed before the requested content at the first instance is completely stored at the first AZ.

In some instances, in response to determining that the mode of replication is synchronous on each iteration, each of the portions of the input stream are provided iteratively to the replication interface of the second instance of the storage service to replicate the stored content at the first file storage of the first AZ to the second file storage of the second AZ.

In some instances, in response to determining that a provided portion for replication at the second file storage failed to be replicated, an asynchronous mode of replication can be configured. The asynchronous mode can be configured for executing a subsequent iteration for data transfer from the first instance of the storage service at the first AZ. In those instances, subsequent portions of the file can be read and stored at the first file storage at the first AZ. In those instances, metadata for the file that is stored at the first file storage at the first AZ can be stored. The metadata can be stored at the in-memory data grid of the first instance of the storage service. The in-memory data grid of the first instance of the storage service can be synchronized with in-memory data grids at other instances of the storage service running at the multiple AZs cloud platform.

In some instances, in response to determining that the mode of replication is changed to synchronous from a previous asynchronous mode, such as where the previous issues have been remedied causing the mode to be an asynchronous mode, metadata for the file that has been stored can be read and processed. In some instances, a change to synchronous mode can be performed after successful replication of all (or a predefined portions of) queued file changes via the asynchronous mode. In some instances, since the file is to be replicated, a lock for the file for limiting accessing can be created. The locking of the file can be created by storing metadata for the file at the in-memory data grid at the first instance of the storage service. The stored file at the first file storage can be read and replicated at the second file storage at the second AZ. The storage at the second file storage can be performed by providing the file to the replication interface of the second instance of the storage service at the second AZ.

In some instances, the in-memory data grid can store the metadata in a queue data structure, where data from the data grid is read in a first-in-first-out mode.

Figure 4:
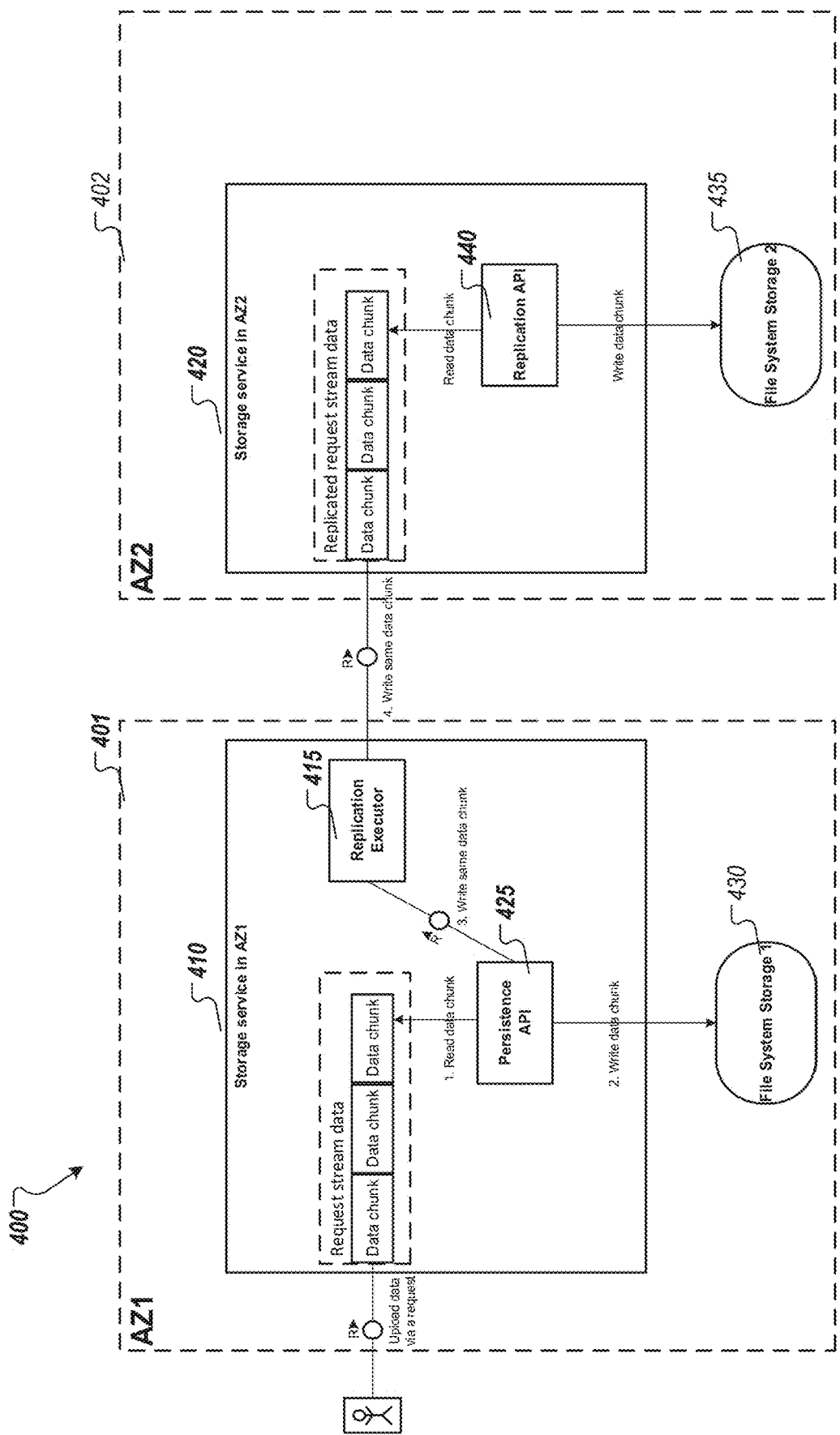
FIG. 4 is a block diagram for an example method for processing a received input stream for a data record that is replicated from one availability zone storage space to another availability zone storage space in accordance with implementations of the present disclosure.

FIG. 4 is a block diagram for an example method 400 for processing a received input stream for a data record that is replicated from one AZ storage space to another AZ storage space in accordance with implementations of the present disclosure. In some instances, the example method 400 can be executed at a cloud platform that can correspond to the cloud platform 200 of FIG. 2. The method 400 can be executed in association with a received request for storing content through a storage service at the cloud platform. The received request and the processing can at least partially correspond to the described method 300 of FIG. 3.

In some instances, in response to receive a request to store content (e.g., a request to upload data through a request of a user), a request input stream of data can be received at a first instance of a storage service 410 at a first AZ 401 of the cloud platform.

In some instances, a persistence interface 425 at the first instance of the storage service 410 can determine that a current configured mode for replication is a synchronous mode, and can start processing the received input stream while simultaneously (or near-simultaneously and/or concurrently) creating a request to a second instance of the storage service 420 at a second AZ 402 to perform replication and synchronization between file storages at both AZs. In some instances, instances of the storage service that run at the first AZ 401 store content at a file system storage 430, and instances of the storage service that run at the second AZ 402 store content at a file system storage 435.

In some instances, in response to receiving a request at the persistence interface 425, the persistence interface 425 can create a similar, new request to the second instance of the storage service 420 in AZ2 through a replication executor 415. The replication executor 415 can be similar to the replication executor 215 of FIG. 2. The persistence interface 425 can start reading the data in chunks (e.g., each chunk can have a size of eight (8) KB, or any other suitable size). In some instances, the persistence interface 425 can read a data chunk and write that data chunk to a stream pointing to the file system storage 430. In some instances, the persistence interface 425 can transfer data chunks to the file system storage 430 through an output stream request, for example a FileOutputStream. In some instances, the persistence interface 425 can write the same read data chunk to the replication executor 415, where the replication executor 415 writes the same read data chunk in a stream that is part of a request to the second instance of the storage service 420 at AZ2 402. In some instances, the stream between the replication executor 415 and the second instance of the storage service 420 can be opened in response to determining by the persistence interface 425 that a request for storing content is received and that the replication mode is synchronous. In some instances, the operation of writing read data chunks from the persistence interface 425 to the replication executor 415 and later to the second instance of the storage service 420 can be iteratively repeated (as shown on FIG. 4).

In some instances, the replication interface 440 at AZ2 402 can read the data chunks from the stream that was opened through the replication executor 415, and can store the read chunks in the file system storage 435 in AZ2. By implementing such an approach where a stream to replicate data at the file system storage 435 in AZ2 is processed in parallel to processing an input stream at the first instance of the storage service to read the data, the solution can provide improved efficiency in processing data and executing data replication that saves time since the read and write operations are performed for smaller size data chunks compared to a full file size and also does not delay replication as the execution at both AZs is completed with a very small time differences (e.g., approx. processing of one data chunk). As such, an improvement measure value for an RPO (Recovery Point Objective) can be achieved (close to 0). This is supported by the fact that writing the last chunk of data in the file system storage 430 in AZ1 401 and writing the same data chunk at AZ2 402 differs just in a few milliseconds delay. The last data chunk would be processed in AZ2 with just a few milliseconds delay corresponding to the time period needed to read and store that data chunk.

Figure 5:
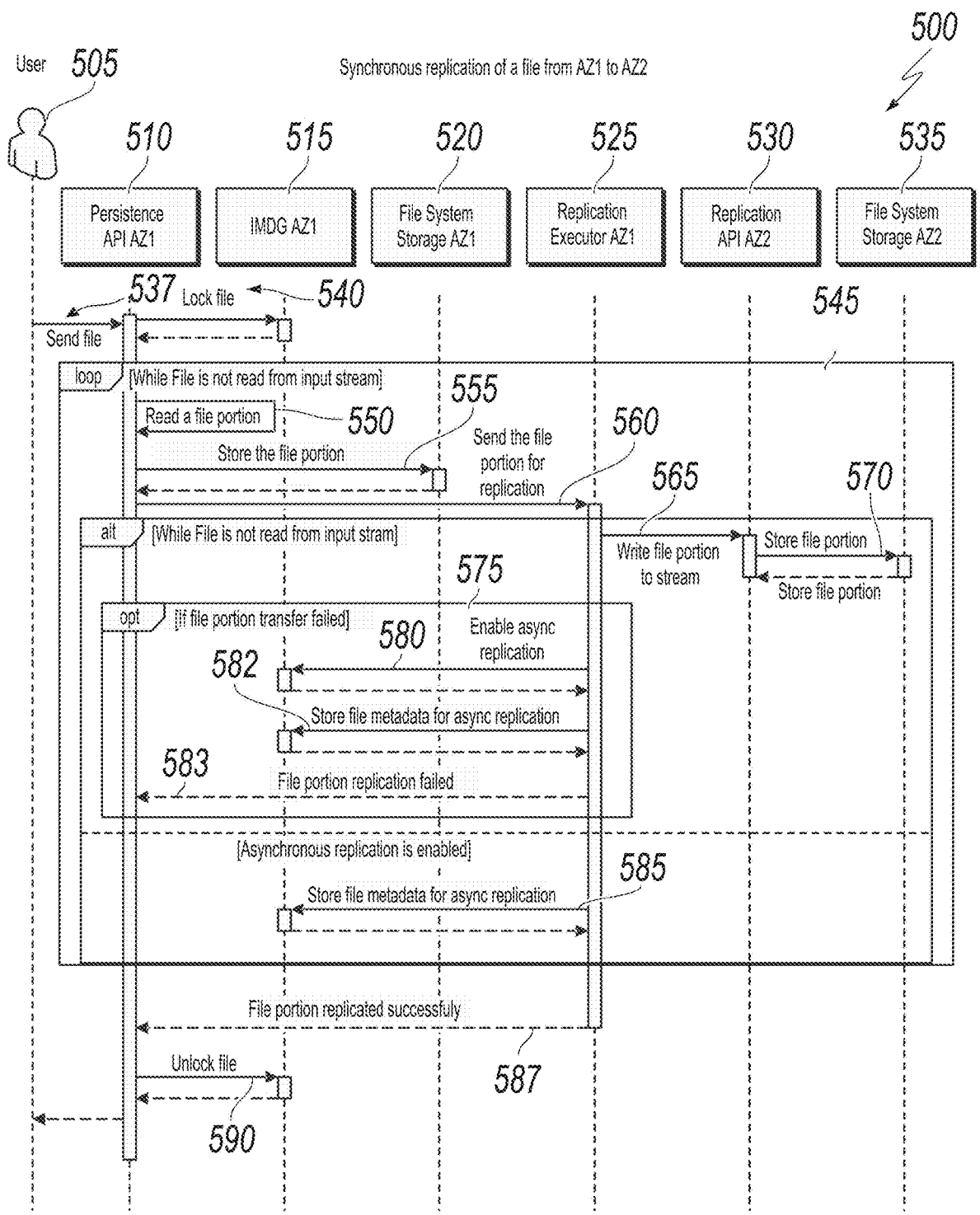
FIG. 5 is a block diagram for an example method for performing a synchronous replication of a file in accordance with implementations of the present disclosure.

FIG. 5 is a block diagram for an example method 500 for performing a synchronous replication of a file in accordance with implementations of the present disclosure. In some instances, the example method 500 may be executed at the cloud platform 200 of FIG. 2. In some instances, a persistence API AZ1 510 can correspond to the persistence interface 220 of FIG. 2, an in-memory data grid (IMDG) AZ1 515 can correspond to the in-memory data grid 210 of FIG. 2, the file system storage AZ1 520 can correspond to the "File System Storage 1" 230 of FIG. 2, the replication executor AZ1 525 can correspond to the replication executor 215 of FIG. 2, the replication API AZ2 530 can correspond to the replication interface 255 of FIG. 2, the file system storage AZ2 535 can correspond to the "File System Storage 2" 235 of FIG. 2. The execution of the method 500 may also correspond to the described method 300 of FIG. 3, as well as any other suitable methods and systems.

In some instances, at 537, a request can be received at the persistence API AZ1 510. The request can be received from the user 505 or can be received from an application or a service, or the like (not shown). The request can be received at an instance of a storage service at one AZ of multiple availability zones of a cloud platform. The received request can be similar to the received request 305 of FIG. 3. The received request can be associated with storing of a file at the cloud platform.

In some instances, in response to receiving the file at the persistence API AZ1 510, the persistence API AZ1 510 sends a request (540) to lock the file to the IMDG AZ1 515. The persistence API AZ1 510 can read (at 550) one portion (e.g., data chunks of FIG. 4) from the received input stream from the user that streams the file content. The persistence API AZ1 510 can request to store (at 555) the read file portion in the file system storage AZ1 520. The persistence API AZ1 510 can send (at 560) the same file portion to the replication executor AZ1 525 for replication. The replication executor AZ1 525 can check the mode of the replication.

In some case, it can be determined that synchronous replication is enabled. In those instances, if the sent file portion at 560 is a first file portion of the file, then the replication executor AZ1 525 can create (at 565) a new request to the replication API AZ2 530 to open a stream to write file portions. The replication executor AZ1 525 can write the file portion to replication API AZ2 530. If the creation of a new request at 565 and/or the writing of a file portion to the replication API AZ2 530 fail (at 575), then the replication executor AZ1 525 can call (at 580) the IMDG AZ1 515 to enable the asynchronous replication. The replication executor AZ1 525 can call the IMDG AZ1 515 to store (at 582) the file metadata to a queue data structure for execution of an asynchronous replication, for example, when the connection between the two AZs can be recovered and a stream for data transfer can be established. In some cases, a notification can be sent at 583 from the replication executor AZ1 525 to the persistence API AZ1 510 to provide information that the file portion replication has failed.

In some instances, when synchronous replication is enabled and the file portion sent at 560 is the last file portion, the output stream request can be closed to finalize the file transfer.

In some instances, the replication API AZ2 530 can store (at 570) the file portion in File System Storage AZ2 535.

In some instances, and in response to determining that asynchronous replication is enabled, the replication executor AZ1 525 can call (at 585) the IMDG AZ1 515 to store the file metadata to add it to the queue data structure for asynchronous replication. In some instances, the call to the IMDG AZ1 515 can be performed only once, and in relation to a first file portion that is identified as unable to be replaced during a synchronous mode. Thus, if a subsequent file portion fails to be replicated, no additional metadata for the stored file would be added to the queue data structure at the IMDG AZ1 515.

In some instances, the process operations at 550, 555, and 560 can be repeated iteratively to read the whole content of the file from the input stream, and corresponding writing operations as further described are correspondingly performed based on the replication mode.

In some instances, in response to fully storing a file locally in AZ1 (and optionally remotely at AZ2), a notification for successful execution can be sent to the persistence API 510 at 587. The persistence API AZ1 510 can call (at 590) the IMDG AZ1 515 to unlock the file and provide access to the content.

In some instances, a request to delete a file can be received at a first instance of the storage service provided at the first availability zone of the multiple availability zone cloud platform. For example, the request can be received and processed at the persistence API AZ1 510. In some instances, in response to receiving the delete request, a lock request can be sent through the persistence API AZ1 510 to the IMDG AZ1 515 to lock the file for accessing. An instruction for execution of a delete operation to delete the file at the first file storage can be sent to the file system storage AZ1 520. The persistence API AZ 510 can communicate with the replication executor AZ1 525, where the replication executor AZ 525 can send a request to the replication interface AZ2 530 of the second instance of the storage service at the second availability zone to delete the file at the second file system storage AZ2 535. In response to determining that deleting at the second file storage is executed successfully, a delete request to the IMDG AZ1 515 can be sent to delete metadata stored for the file. For example, the deletion request to the IMDG AZ1 515 can be sent in response to receiving a notification from the replication API AZ2 530 at the replication AZ1 525 for a successful execution of the deletion operation.

Figure 6:
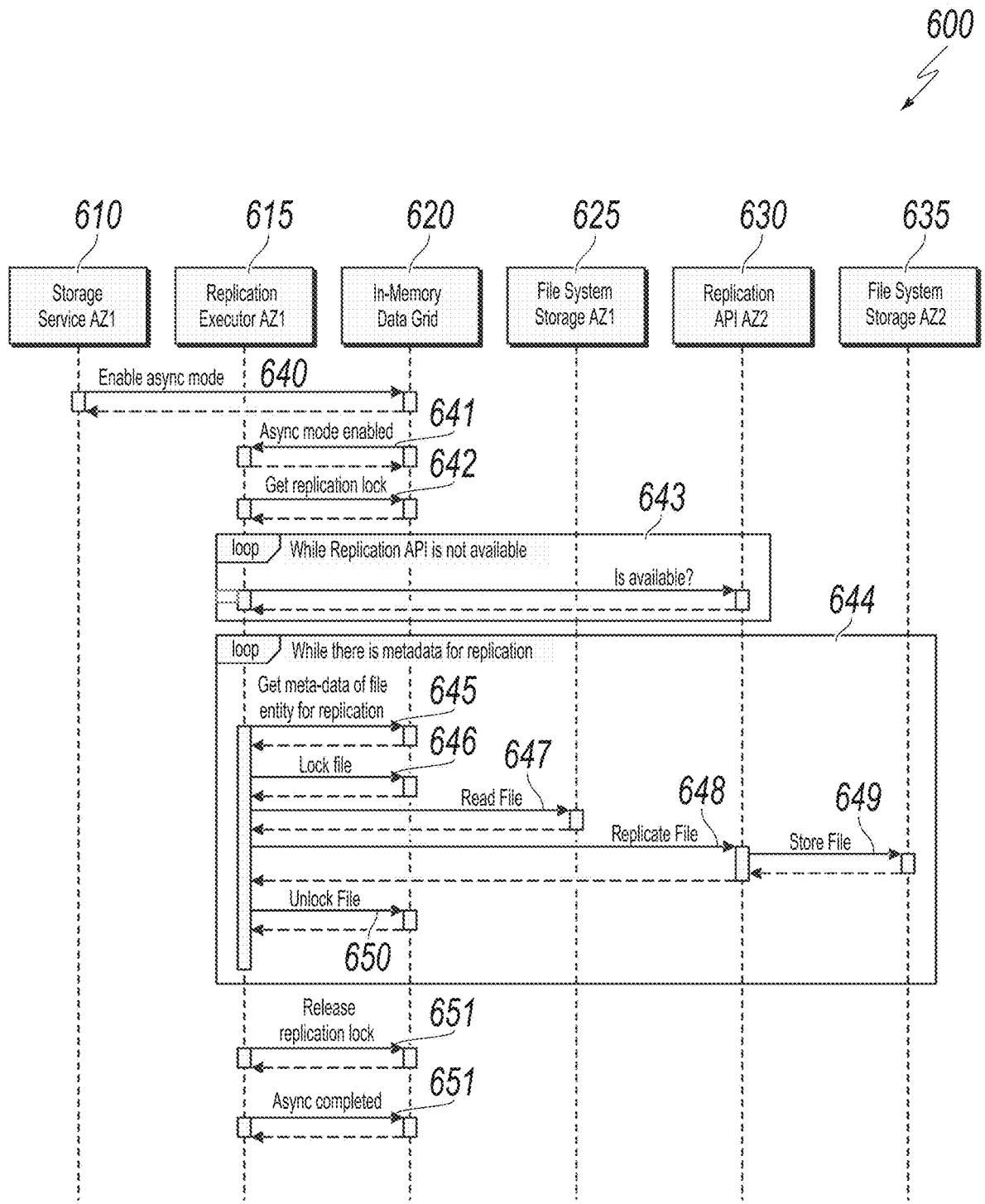
FIG. 6 is a block diagram for an example method for performing an asynchronous replication of a file in accordance with implementations of the present disclosure.

FIG. 6 is a block diagram for an example method 600 for performing an asynchronous replication of a file in accordance with implementations of the present disclosure. In some instances, a storage service AZ1 610 can correspond to the first instance of the storage service 205 of FIG. 2, a replication executor AZ1 615 can correspond to the replication executor 215 of FIG. 2, the in-memory data grid 620 can correspond to the in-memory data grid 210 of FIG. 2, the file system storage AZ1 625 can correspond to the "File System Storage 1" 230 of FIG. 2, the replication API AZ2 630 can correspond to the replication interface 255 of FIG. 2, the file system storage AZ2 635 can correspond to the "File System Storage 2" 235 of FIG. 2.

The example method 600 defines operations that can be executed when the first instance of a storage service, here, storage service AZ1 610—at a first AZ of a cloud platform (e.g., cloud platform 200 of FIG. 2) is enabled to execute replication in an asynchronous mode. The enabling for execution in asynchronous mode can be performed when a connectivity issue or other technical failure does not support establishing a connection between the first instance of the storage service and a second instance of the storage service at the second AZ.

In some instances, the storage service AZ1 610 can be associated with a specific property in the in-memory data grid 620 that define whether the storage service AZ1 610 can execute replication in an asynchronous or a synchronous mode. The in-memory data grid 620 can store a value for the property (e.g., enabled or disabled) to define whether asynchronous mode of replication is enabled or disabled. The property value can be used to notify replication executors at different instances of the storage service for enabling or disabling of the asynchronous replication.

In some instances, each instance of the storage service, such as the storage service AZ1 610, includes a running instance of the replication executor, such as the replication executor AZ1 615. In some instances, replication executors at instances of the storage service can be assigned to receive notifications for changes in the property defining whether asynchronous replication mode is enabled or disabled. In some instances, asynchronous replication can be enabled by the storage service or by any instance of the replication executor. For example, the replication executor can enable asynchronous replication is cases of failure in executing synchronous replication. When asynchronous replication is enabled, a replication executor can start storing asynchronous replication requests in a queue data structure instead of performing those replication request synchronously.

At 640, the storage service AZ1 610 sends a request to the in-memory data grid 620 to enable asynchronous replication mode. At 641, the in-memory data grid 620 can send a request to the replication executor AZ1 615 to enable asynchronous mode of replication. Such request can correspond to the request 580 described in FIG. 5 and when an asynchronous mode is configured for executing replication for a file where a file portion has failed transferring. At 642, the replication executor AZ1 615 can define a replication lock at the in-memory data grid 620. The definition of a lock at the replication executor instance 615 can be defined to guarantee that the replication executor AZ1 615 is going to replicate data from the first AZ to the second AZ.

At 643, the replication executor AZ1 615 can start to check whether the Replication API 630 in AZ2 is available. In some instances, such a check is performed because in some cases AZ2 can be down due to an outage or connectivity issues.

In some instances, if it is determined that the replication API AZ2 630 is available (can be contacted), the replication executor AZ1 615 can start replication (at 644) while there is metadata entries for files, where such metadata data is stored in the queue data structure at the IMDG 620 for replication.

At 645, the replication executor AZ1 615 can get metadata for a file entry for replication from the in-memory data grid 620, for example, from a queue data structure that stores data for files that are to be replicated with an asynchronous mode. For example, the metadata can be stored at the in-memory data grid 620 as described in 582 of FIG. 5. The replication executor AZ1 615 can acquire metadata from the in-memory data grid 620 until there are records in the data structure associated with executing a replication.

At 646, the replication executor AZ1 615 can define a lock for the file for which the metadata is taken (the file for replication). In some instances, the lock can be defined by using a file path.

At 647, the replication executor can read data from the file system storage AZ1 625.

At 648, the replication executor AZ1 615 replicates the data to the Replication API AZ2 630.

At 649, the replication API AZ2 630 stores the data in the File System Storage AZ2 635.

At 650, in response to being notified for the stored file from the replication API AZ2 630, the replication executor AZ1 615 requests to unlock the file from the in-memory data grid 620 (650). At 651, the replication executor AZ1 615 release the replication lock for the replicated file. The replication executor AZ1 615 can disable (at 651) the asynchronous replication once the asynchronous replication is completed. This can happen if all the data is replicated from one zone to the other, for example, from AZ1 to AZ2.

Asynchronous Data Replication in a Multiple AZ Cloud Platform

In some instances, asynchronous replication of data between different AZs of a cloud platform can be associated with a large amount of network traffic. In some instances, if multiple operations are executed on a single file, replication of all of the changes to the single file have to be replicated. By processing all of the changes as separate data replication executions, high volume of data transfer can be produced between the different AZs.

For example, a service can store files and a request to store a file of 500 MB can be received, where the file is changed four times and after that deleted. The changes can be performed through one instance of the service at a first AZ and changes can be necessary to be replicated to provide synchronization of the content at the different zones. In that example, if all the changes are replicated (for example, in sequence), five data replication executions can be performed to save changes for the file five times and replicate each change, while the last change would be a deletion. Thus, the first four changes become obsolete (or unnecessarily), as even if they are transferred the file is deleted in the end.

In some instances, replication of data executed by storage services to provide data synchronization between data stores at different AZs can be associated with high load imposed on the storage service instances running at the different zones of the cloud platform. Such load on the service instances can have an impact on the performance of the storage service with respect to new requests. For example, speed for processing new requests can be reduced, requests can get interrupted, and instances of the storage service can experience downtime (or non-operational time). When data replication is performed, size of the storage is also relevant. In some instances, replication can be performed to optimize the use of storage space to transfer changes. In the example of the file that is replicated and is associated with 5 changes where the last one is a deletion, to be able to execute a replication of one of the first four changes, storage space at the store of the second AZ may be used, while such storage space usage can be avoided if no replication is executed due to a later delete operation that overrules the other changes.

In some instances, to optimize data replication operations during asynchronous replication, filtering of obsolete or redundant replications can be performed. Such filtering can be performed by evaluating a data structure including metadata for the changes made to a given file within an AZ that are all associated with replications to another AZ.

In some instances, a data structure can be defined to store data for executed store operations related to file storage at an instance of a storage service, and such data structure can be accessible or made otherwise shared with other instances of the storage service. The data structure can be implemented to support operations that can invoke data from the structure. In some instances, the data structure may support operations such as adding, peeking (searching), and removing (or deletion). These operations can be performed at a queue data structure and also in association with a map structure.

In some instances, an in-memory data grid structure, as discussed in association with FIGS. 2, 3, 4, 5 and 6, can be implemented to include a queue data structure and a map structure to store metadata for stored artifacts by an instance of a storage service at a corresponding file system storage at the corresponding AZ of the cloud platform. The in-memory data grid includes the map and the queue data structure to provide access to the stored data to all instances of the storage service.

In some instances, by executing an add operation in the in-memory data grid, a record including metadata associated with a file is stored. The metadata can be stored in the map if information for the file does not already exist. In some cases, if there is a record in the map that is related to the file, that record can be updated to include metadata associated with the current request for inclusion of metadata for the file. Thus, the map can include a single instance record for a file that has to be replicated.

In some instances, a peek operation can be executed on the metadata stored at the in-memory data grid. By executing a peek operation, the queue data structure is queried to determine whether a head element of the queue data structure includes corresponding metadata for a file determined in the map. For example, it can be determined whether a head element associated with a file A of the queue includes metadata defining the same time stamp and/or operation, as the metadata defined for the file A in the map (where there is only one record instance for file A with the latest operation executed for file A).

In some instances, it can be determined that the head element from the queue data structure is not present in the map. In response to this determination, the file associated with a record in the queue and not in the map may be determined to be skipped/excluded from replication and a next element from the queue can be evaluated. By applying this configuration of executing replication, redundant operations that do not change the end result of the final version of a file can be excluded, thus, optimization and resource spending efficiency can be achieved.

In some instances, a remove operation can be executed on the in-memory data grid to delete metadata records for files that are not relevant for executing replication.

Figure 7:
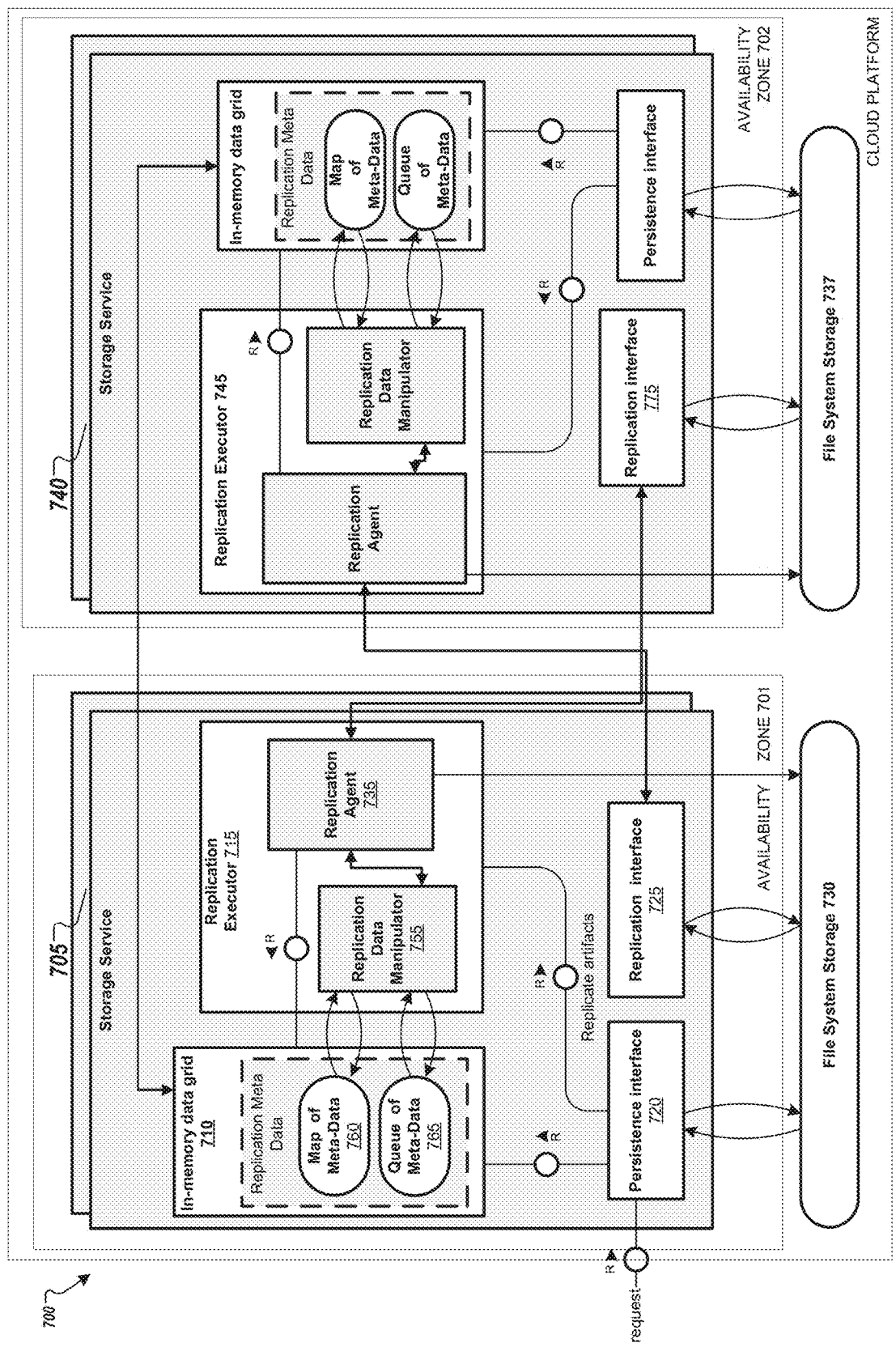
FIG. 7 is a is a block diagram for an example cloud platform environment provided with tools and techniques to manage asynchronous data replication between different storages at the different zones in accordance with implementations of the present disclosure.

FIG. 7 is a block diagram for an example cloud platform 700 provided with tools and techniques to manage asynchronous data replication between different storages at the different zones in accordance with implementations of the present disclosure.

In some instances, the cloud platform 700 include a first AZ (AZ1) 701 and a second AZ (AZ2) 702. The cloud platform 700 may correspond to the cloud platform 200 described in association with FIG. 2. The cloud platform 700 may provide services to store artifacts (or files) at a storage. The cloud platform 700 can implement a storage service that is executed with multiple instances that are run at the two AZs (as well as others not shown in FIG. 7). In some instances, one instance of the storage service can be run at each AZ. In some other instances, to provide improved reliability and responsiveness of execution of operations, the storage service may be deployed with at least two instances at each of the two AZs.

In some instances, the persistence interfaces at the storage service instances can correspond to the persistence interface 220 and 260 of FIG. 2, the replication interfaces can correspond to the replication interfaces 225 and 255 of FIG. 2, the replication executors can correspond to the replication executors 215 and 245 of FIG. 2.

In some instances, the storage service includes a first instance of the storage service 705 running at the AZ1 701 and a second instance of the storage service 740 at AZ2 702. In some instances, a customer (for example, a user) may communicate with the storage service through the first instance of the storage service 705.

In some instances, a persistence interface 720 instantiated at the first instance of the storage service 705 can receive a request (or more) for providing files (or artifacts) to be stored in a file system storage. The file system storage may be associated with multiple instances corresponding to the different AZs. In some instances, the persistence interface 720 can be responsible to store data (e.g., a requested file) on file system storage 730 that is one instance of the storage for the cloud platform. The data that is stored corresponds to the request and may be associated with uploading a new file, modifying a file, adding content to a file, deleting a file, or otherwise manipulating a file.

In some instances, the file system storages at the different AZs can be maintained synchronized between each other and having corresponding content (e.g., the same content or substantially the same) to support execution of corresponding services through different instances of the storage service at different AZs. In some instances, the persistence interface 720 can provide metadata for the file associated with the received request for replication to the replication executor 715. In some instances, the metadata can be stored only when a mode for the data replication is defined as asynchronous. In some instances, a determination of the replication mode can be performed. The determination can be performed by checking a parameter defined in the in-memory data grid 710 to determine whether the asynchronous replication is enabled. In some more instances, the persistence interface can request to perform a lock for the file associated with the received request and with replication during asynchronous mode. In some instances, the lock for the file can be performed before storing the file in the file system storage 730. In some instances, the lock to the file can be performed by storing a record at the in-memory data grid 710 to prevent the replication agent 735 (part of the Replication Executor 715) from replicating data which is modified at the same time.

In some instances, the replication executor 715 may include a replication data manipulator 755 and the replication agent 735 that can be used when executing asynchronous replication. In some instances, the replication data manipulator 755 can support execution of operations or methods (for example, add, peek, or remove) for managing and processing records stored at a queue data structure 765 and a map 760 (which are instances in in-memory data grid). The queue data structure and the map store metadata for files that are to be replicated in an asynchronous mode. Entries in these data structures are performed when the mode for replication is defined as asynchronous. In some instances, the entries in these data structures can be evaluated in response to determining that a replication from a first AZ 701 to a second AZ 702 is possible. In some other instances, the entries in these data structures are evaluated when it is determined that connection between different instances of the storage service can be established to execute replication. In some instances, the map and the queue data structure store elements that are records including metadata for files that are relevant for executing data replication.

In some instances, evaluations over metadata stored at the in-memory data grid 710 can be performed by executing supported operations and methods (e.g., add, peek, remove, etc.) to evaluate different records within the queue data structure and the map. The evaluation of the records in the queue and the map can be performed to remove redundant operations that are performed on the files and are recorded in the queue data structure, but which can be determined as obsolete for the final state of the file that is to be replicated. For example, even if there are multiple modification for a file, if a latest operation is deletion, then performing of replications corresponding to the modifications done before the deletion can be determined to be obsolete, and may be excluded from replication. In doing so, the only executed operation can be an operation to delete the record of the file from the file system storage. Further detailed description of methods for evaluating metadata at the in-memory data grid 710 are provided in association with the description of FIGS. 9 to 13.

In some instances, the replication agent 735 can start processing in response to determining that asynchronous replication is enabled. The replication agent 735 can take responsibility to replicate files for which there is stored metadata in the in-memory data grid 710. The replication agent 735 can access the in-memory data grid 710 and can evaluate the metadata stored in the map 760 and the queue data structure 765. The replication agent 735 can acquire metadata for files for replication, for example, on a single processing basis (one-by-one), or in parallel processing, through the replication data manipulator 755 and replicate the files identified based on evaluation of the metadata from the file system storage 730 to file system storage 737 (or vice versa). The replication agent 735 can also define a lock on a file that is taken for replication in response to starting the replication. By defining the lock, modification of data on a file that is currently being replicated can be avoided. In response to successfully defining a lock for a given file, the replication agent 735 can replicate the file in accordance with the determined versions or operations for replication.

In some instances, the replication agent 735 sends content of the file for replication to a replication interface 775 at the second instance of the storage service 740. In some instances, the replication interface 775 can be implemented as an API, for example, a restful web service that is responsible to store data in the persistence store (i.e. file system storage 737), which is located in the same AZ (i.e., AZ2 702).

In some instances, the queue data structure 765 may store metadata for files for replication, where the metadata can be stored in the form of records (or objects) including different record attributes. For example, a replication metadata object in the queue data structure 765 can be defined according to a data model defined in Table 1 below:

TABLE 1

ReplicationInfo

EntityType entityType (File, Dir)
OperationType operationType (Delete, Upload)
Long timeStamp
String path In some instances, the replication metadata object can include metadata defining the type of the entity to be replicated. For example, the replication can be executed not only for a file, but also for other entity types, such as a data object, a directory, a component, among other examples or artifacts that can be stored by a storage service provided on a cloud platform. In some instances, the replication metadata object can include also an operation type that is associated with the stored operation performed for the entity by the storage service, for example, deletion, uploading, modification, others. In some instances, the metadata object can include a time stamp to define when the operation for the file was executed (or requested to be done) and a path for locating the file. For example, the path can provide a location of the file on the first system storage 730.

In some instances, in order to store the metadata for files for replication, replication metadata objects can be generated and stored at the queue data structure. In some instances, the queue data structure 765 in the in-memory data grid 710 includes one or more records corresponding to replication metadata objects generated for files associated with requests at the storage service at the first instance 705. In some instances, the metadata for the files is stored in a queue data structure where each new element is added to the tail of the queue. In some other instances, other types of data structures can also be used to maintain metadata for files for replication.

In some instances, the map 760 of the in-memory data grid 710 can include elements that include as a key a path to locate the file (corresponding to the path attribute of the metadata object at the queue 765) and the corresponding metadata object.

Figure 8:
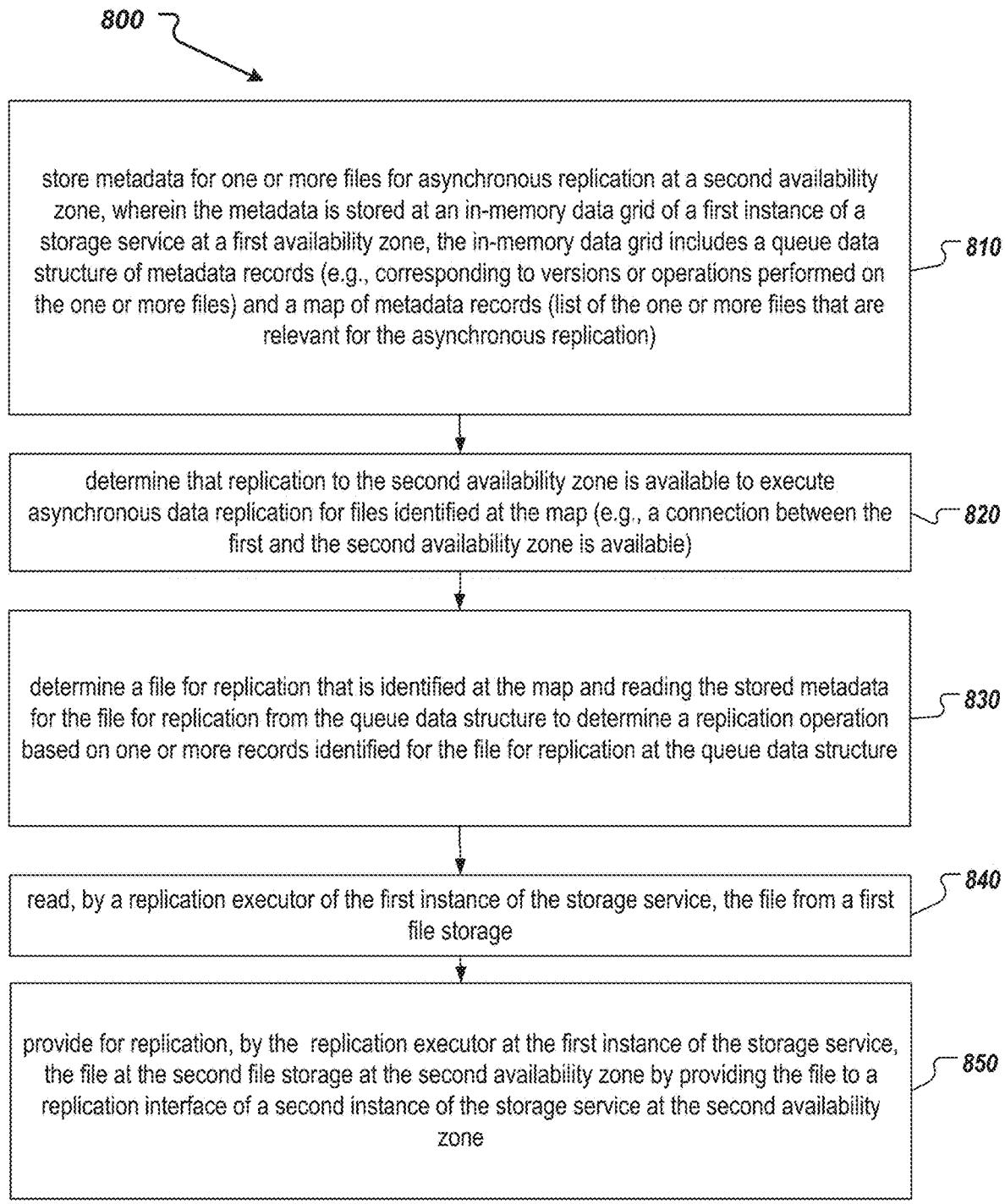
FIG. 8 is a flowchart for an example method for managing asynchronous data replication in a cloud environment including multiple availability zones in accordance with implementations of the present disclosure.

FIG. 8 is a flowchart for an example method 800 for managing asynchronous data replication in a cloud environment including multiple AZs in accordance with implementations of the present disclosure. In some instances, the method 800 may be executed at the cloud platform 700 of FIG. 7.

In some instances, the asynchronous data replication can be executed as part of a data replication process that is configured to include both asynchronous and synchronous data replication based on a configured mode, as discussed in the description for FIG. 5. In some instances, the asynchronous data replication is executed to synchronize file system storages associated with instances of a storage service at different AZs. For example, synchronization can be performed at a first and a second AZs that are included in a multiple availability cloud platform providing storage services.

At 810, metadata for one or more files for asynchronous replication is stored at a second AZ. The metadata can be stored at an in-memory data grid of a first instance of a storage service at a first AZ. For example, the metadata can be stored as described for FIG. 7 and the in-memory data grid 710 where metadata is stored in the queue data structure 765 and the map 760.

In some instances, the in-memory data grid can include a queue data structure of metadata records and a map of metadata records. The metadata records in the queue data structure may correspond to the replication metadata objects in the description of FIG. 7 and may correspond to the data model in Table 1. The records in the map can be defined as key pairs, where a key can be a path for the file, and a corresponding value can be a metadata object for the replication of the file with the corresponding modification. In some instances, the queue data structure may include multiple records for a single file, where those records can be associated with different requests in association to the file that can include different changes of the content for the file.

In some instances, the queue data structure can include one or more records corresponding to versions of a file from the one or more files for replication from the first AZ to the second AZ. In some instances, a record from the queue data structure includes metadata for a corresponding request for storing content for a file that has been received at the instance of the storage service. In some instances, the map of metadata records can identify the files that are associated with requests for storing content that are not yet replicated at the second AZ of the multiple AZ cloud platform.

At 820, it is determined whether replication to the second AZ is able to execute asynchronous data replication for files identified at the map. In some instances, the determination can include determining whether communication between the two AZs can be performed, for example, when there is a connection between the first and the second AZ. In some of those instances, if a network outage is identified between the two AZs, the communication can be unavailable. For example, a determination for an issue in the communication between two AZs can be determined if a network call from one of the AZs to the other one has failed. In cases where it is determined that communication between the two AZs cannot be established (or is not reliable), an asynchronous mode for data replication can be defined. Once the connection between the different AZs is recovered, asynchronous replication for files identified at the map during the period of failing communication can be executed.

At 830, a file for replication that is identified at the map is determined. The stored metadata for the identified file is read for executing the replication. The reading is performed through reading records from the queue data structure. The read metadata is evaluated to determine a replication operation based on one or more records identified for the file for replication at the queue data structure.

At 840, the identified file is read from a first file system storage by a replication executor of the first instance of the storage service.

At 850, the file is provided for replication at the second file storage at the second AZ. The file can be provided to a replication interface of a second instance of the storage service at the second AZ by the replication executor.

Figure 9:
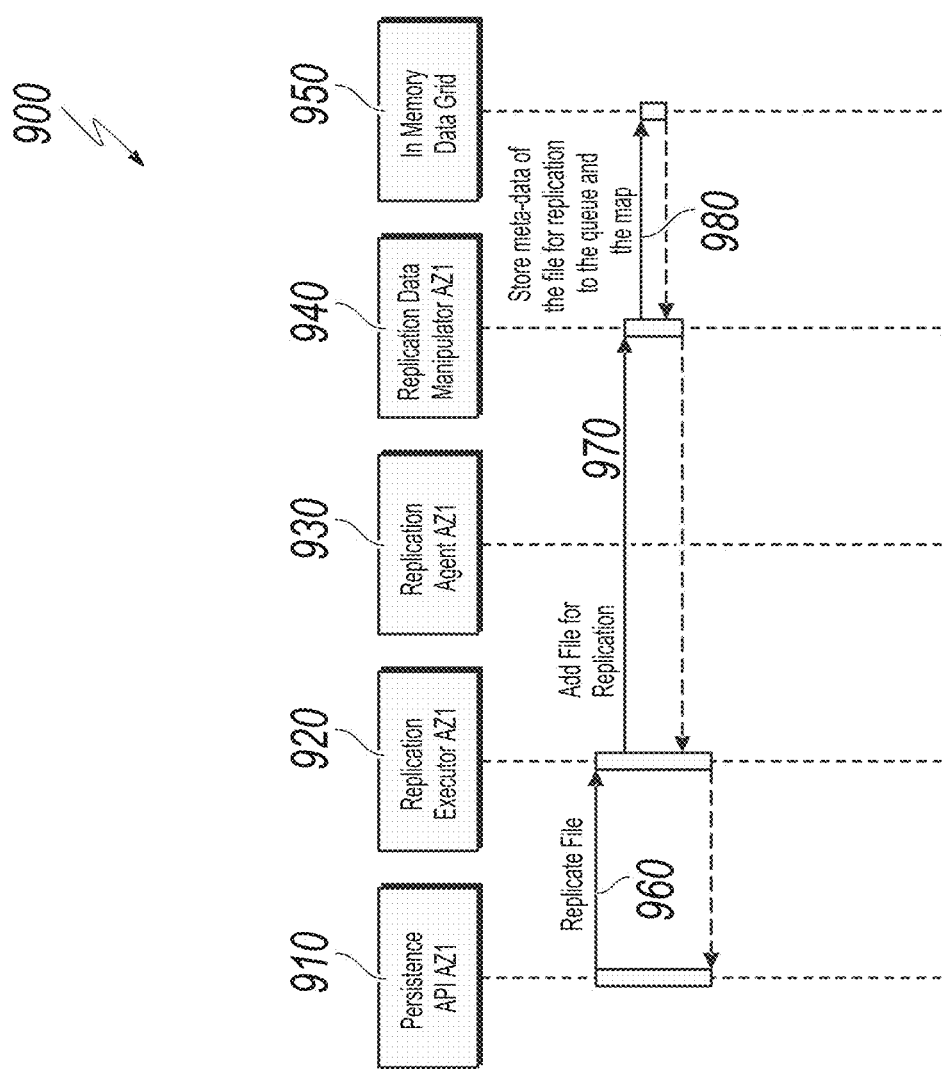
FIG. 9 is a block diagram for example method for storing metadata for a file to be asynchronously replicated from one availability zone to another in accordance with implementations of the present disclosure.

FIG. 9 is a block diagram for example method 900 for storing metadata for a file to be asynchronously replicated from one AZ to another in accordance with implementations of the present disclosure.

The example method can be executed at a cloud platform correspondingly similar to the cloud platform 700 of FIG. 7. The method 900 can be executed in relation to a persistence API AZ1 910 that corresponds to the persistence interface 720 of FIG. 7, a replication executor AZ1 920 that corresponds to the replication executor 715 of FIG. 7, a replication agent AZ1 930 that corresponds to the replication agent 735 of FIG. 7, a replication data manipulator AZ1 940 that corresponds to the replication data manipulator 755 of FIG. 7, and an in-memory data grid 950 that corresponds to the in-memory data grid 710 of FIG. 7.

At 960, the Persistence API AZ1 910 executes a call the Replication Executor AZ1 920 to provide a file for replication. In some instances, if asynchronous replication is enabled for the data replication, the Replication Executor AZ1 920 sends a request to the Replication Data Manipulator AZ1 930 in order to store metadata for the file for replication. The storing of metadata may be performed at the in-memory data grid 950 and in accordance with the description of the storing of metadata at the queue data structure and the map as described for FIG. 7 and FIG. 8.

In some instances, the Replication Data Manipulator 940 requests to store (add) a metadata record in the queue data structure for the file for replication. The map in the in-memory data grid 950 can be updated to include an element for the file that corresponds to the file as requested. The map's element may be based on metadata for the operation executed for the file as stored in the metadata record in the queue data structure.

Figure 10:
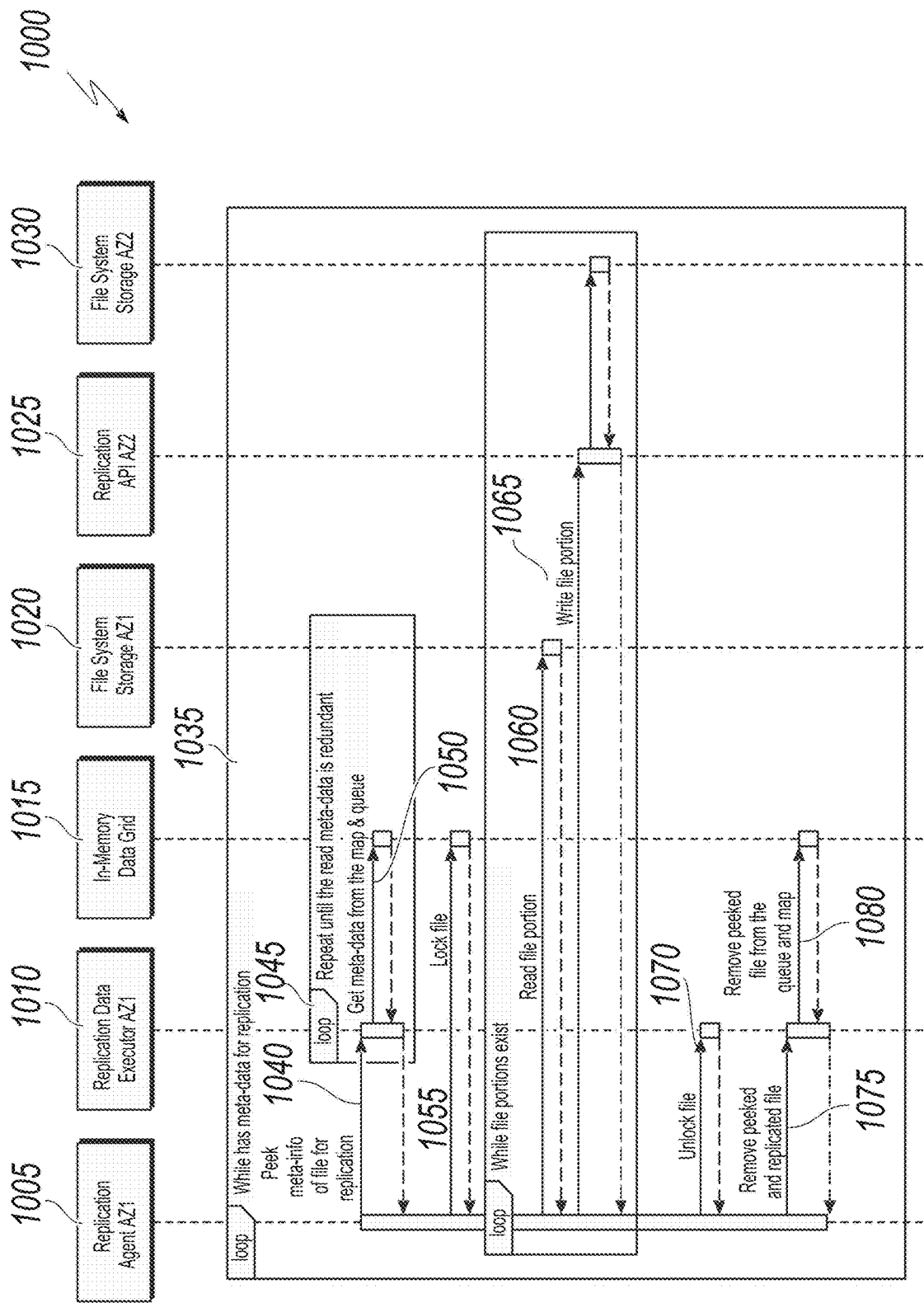
FIG. 10 is a block diagram for an example method for performing an asynchronous replication of a file in accordance with implementations of the present disclosure.

FIG. 10 is a block diagram for an example method 1000 for performing an asynchronous replication of a file in accordance with implementations of the present disclosure.

The method 1000 can be executed over a multiple AZ cloud platform corresponding to the cloud platform 700 of FIG. 7. The replication agent AZ 1005, the replication data manipulator AZ1 1010, the in-memory data grid 1015, the file system storage Az1 1020, the replication API Az2 1025, and the file system storage AZ2 1030 can correspond to the similar components discussed for FIG. 7. The method 1000 can be executed iteratively (looped in 1035) while there is metadata stored for files for replication that are not yet replicated asynchronously from a first AZ (AZ1) to a second AZ (AZ2). The in-memory data grid 1015 can store metadata for files that are awaiting asynchronous replication. The stored metadata may be similar to the described metadata stored at the in-memory data grid 710 of FIG. 7.

At 1040, the replication agent AZ1 1005 can invoke a peek operation to be performed for metadata of a file for replication by the Replication Data Manipulator AZ1 1010. At 1050, and in response to the invoked peek operation, the replication data manipulator AZ1 1010 can initiate a call according to the peek operation to the in-memory grid 1015 to iterate over the stored records in the queue data structure and the map, and to acquire metadata. In some instances, the execution of the peek operation can be executed as described in further details for FIG. 12.

In response to executing the peek operation by the replication data manipulator AZ1 1010 at the in-memory data grid 1015, metadata is taken out of the map and the queue data structure iteratively. In those instances, the head object of the queue data structure is taken for processing if a corresponding element exists in the map. At 1050, metadata for an element from the map and a head object in the queue data structure including a replication data object are taken. In some instances, if there are no elements in the queue data structure and the map, the replication data manipulator AZ1 1010 can return no files for replication and the replication method can be terminated or temporary paused until further metadata is generated in the in-memory data grid 1015. In cases where the queue data structure and the map include elements, then at 1055, the replication agent AZ1 1005 initiates a lock on the file.

At 1060, the file can be read. In some instances, the file can be read in portions, such as the data chunks as discussed for FIGS. 2 and 3. The file can be read from the file system storage AZ1 1020. The Replication Agent AZ1 can execute a call to the Replication API AZ2 1025 to write the read file (or file portions). Thus, the reading operation 1060 and the writing operation 1065 can be executed iteratively. In some instances, those operations can be executed in parallel, and a write operation can be initiated once a portion has been already read and while a subsequent portion is currently read. In some instances, the replication agent AZ1 1005 can provide the file portion for writing to the replication API AZ2 1025 that can take care of providing and storing the file portion at the file system storage AZ2 1030.

In some instances, if a call to the Replication API AZ2 1025 fails or becomes otherwise unsuccessful while the file is transferred from AZ1 to AZ2, then the replication can be retried (or executed subsequently). The Replication API AZ2 1025 stores the file portion in the file system storage in AZ2 1030 that can provide a response to the replication agent AZ1 upon successful completion of the storing. The execution of operations 1060 and 1065 can be performed multiple times corresponding to the number of portions defined for a replicated file.

At 1070, the Replication Agent AZ1 1010 releases the file lock once the replication (write operation) is performed. At 1075, if the replication is successful, then the Replication Agent AZ11005 can call the Replication Data Manipulator AZ1 1010 and provide the peeked element (at 1040 and 1050) in order to remove it from the queue and the map. At 1080, the replication data manipulator AZ1 1010 can request a remove operation for the peeked file from the queue and the map at the in-memory data grid 1015.

In some instances, in case of unsuccessful replication, records from the queue data structure and the map that correspond to the peeked replication metadata object may not be removed from the queue data structure and the map. The records from the queue data structure and the map can be removed in response to successful replication of the file.

Figure 11:
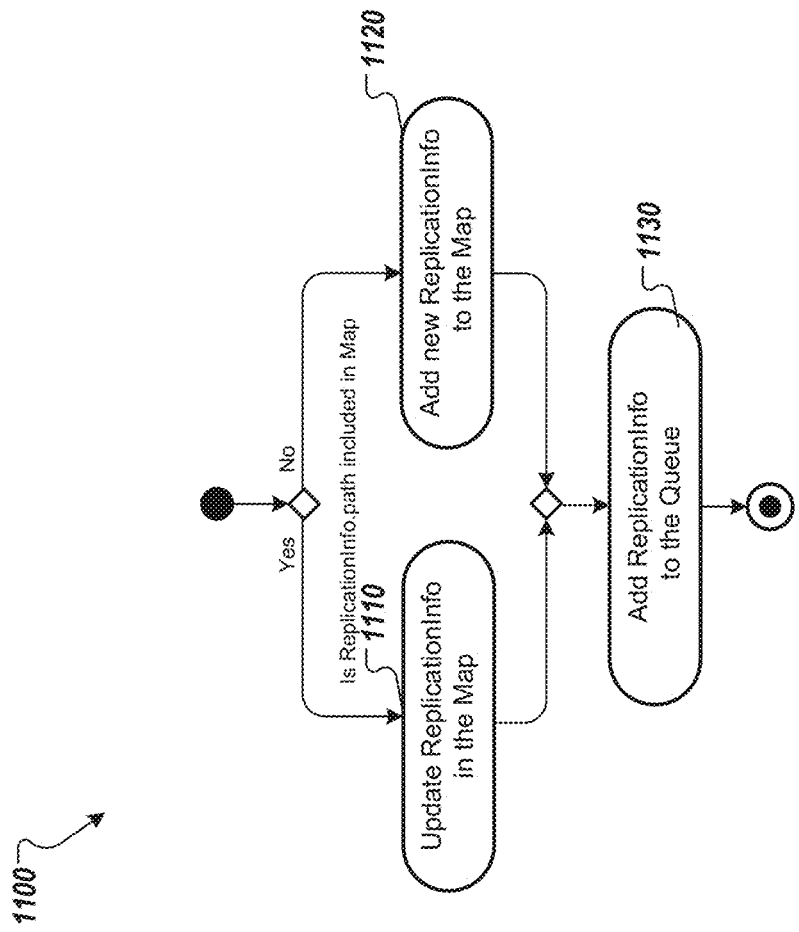
FIG. 11 is a block diagram for an example method for executing an add operation for an element in a map of an in-memory data grid at an instance of a storage service in accordance with implementations of the present disclosure.

FIG. 11 is a block diagram for an example method 1100 for executing an add operation for an element in a map of an in-memory data grid at an instance of a storage service in accordance with implementations of the present disclosure. In some instances, the map of the in-memory data grid can correspond to the map 760 of the in-memory data grid 710 of FIG. 7.

The add operation can be executed to add an element in the map that corresponds to a file that is for replication. The element can include metadata for the file that can be used to execute the replication. In some instances, the map includes value pairs that include as key a path for the file to be replicated and as value the replication metadata object that is correspondingly stored in a queue data structure at the in-memory data grid including data for the operation executed in association with storing the file (e.g., type of operation such as upload or delete, time stamp, others).

In some instances, by executing an add operation, a new replication metadata object can be created. The new replication metadata object can correspond to the described objects for storing in the queue data structure and may be defined according to the model of Table 1. In some instances, to execute the add operation to the map in the in-memory data grid, the map can be evaluated to determine whether there is an element in the map that corresponds to the same file. At 1110, if it is determined that there is already an element into the map that includes as a key corresponding to the path for new replication metadata object, an object value corresponding to the key in the element of the map can be updated. In other cases, where a determination is made that the map does not include an element associated with the file for replication, at 1120, then a new element can be added to the map. The new element can be populated with the path for the file from the new replication metadata object for the key, and with the new replication metadata object for the value. At 1130, the new replication metadata object can be added to the queue data structure.

Figure 12:
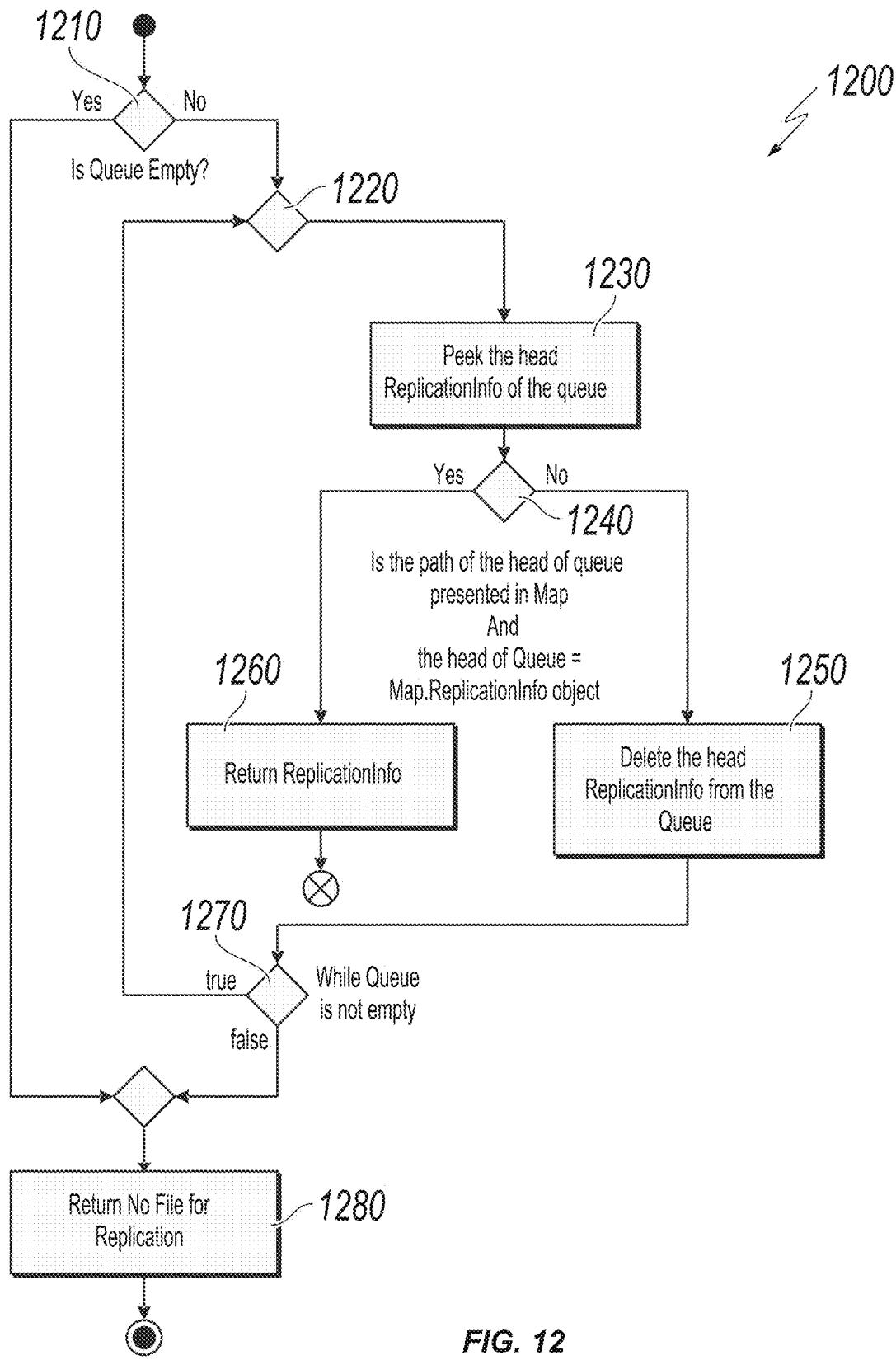
FIG. 12 is a block diagram for an example method for executing a peek operation on a queue data structure maintained at an in-memory data grid at an instance of a storage service in accordance with implementations of the present disclosure.

FIG. 12 is a block diagram for an example method 1200 for executing a peek operation on a queue data structure maintained at an in-memory data grid at an instance of a storage service in accordance with implementations of the present disclosure. In some instances, the map of the in-memory data grid can correspond to the map 760 of the in-memory data grid 710 of FIG. 7. In some instances, when the peek operation is executed on the queue data structure, the peek operation returns a replication metadata object including metadata for a file for replication. The replication metadata object can include metadata for the file that can be used to execute the replication. In some instances, the map includes value pairs that include as key a path for the file to be replicated and as value the replication metadata object that is correspondingly stored in a queue data structure at the in-memory data grid including data for the operation executed in association with storing the file (e.g., type of operation such as upload or delete, time stamp, others).

At 1210, in response to invoking a peek operation for a file for replication, it can be determined whether the queue data structure at the in-memory grid is empty. If the queue data structure is empty, then at 1280, no file for replication can be returned as it is not existing. The peek operation as executed is an iterative operation that is executed on the queue data structure and it provides replication metadata objects for files for replication and also reduces the stored data in the queue data structure. The peek operation ends its iterative execution when the queue data structure is empty (determined at either 1210 or 1270).

At 1230, the head element of the queue data structure is peeked to determine (1240) whether the head element of the queue corresponds to an element present in the map. In some instances, based on executing the peek operation, metadata associated with a peeked file is returned only if metadata at the head of the queue data structure includes data corresponding to the metadata at the map, for example, if the metadata stored for the head element in the queue data structure corresponds to the metadata stored for the file at the map. As the map metadata is associated with a latest execution for a given file, if the metadata in the map and in the queue data structure for the given file corresponds, then the replication metadata object corresponds to an operation that is executed as a latest operation for the file. For example, comparison between a record (or element) in the map and a record in the queue to determine whether they correspond can be performed based on information such as timestamp, operation type, path, or other metadata stored in the corresponding records. If, at 1240, it is determined that the head element of the queue does not correspond to a record stored in the map (that is, to a record associated with a file corresponding to the head element of the queue), then method 1200 continues at 1250, where the head element of the queue is deleted, and then to 1270, where the queue is iteratively processed with respect to a subsequent head element of the queue. Thus, if the head element of the queue data structure is not presented in the map, then the head element can be removed and a next element from the queue is processed as a head of the queue data structure.

If, at 1240, it is determined that the head element of the queue corresponds to an element in the map, then the metadata replication object representing the head element of the queue is provided for execution of replication (at 1260). Once processing of the head element is done, the process is finished.

Figure 13:
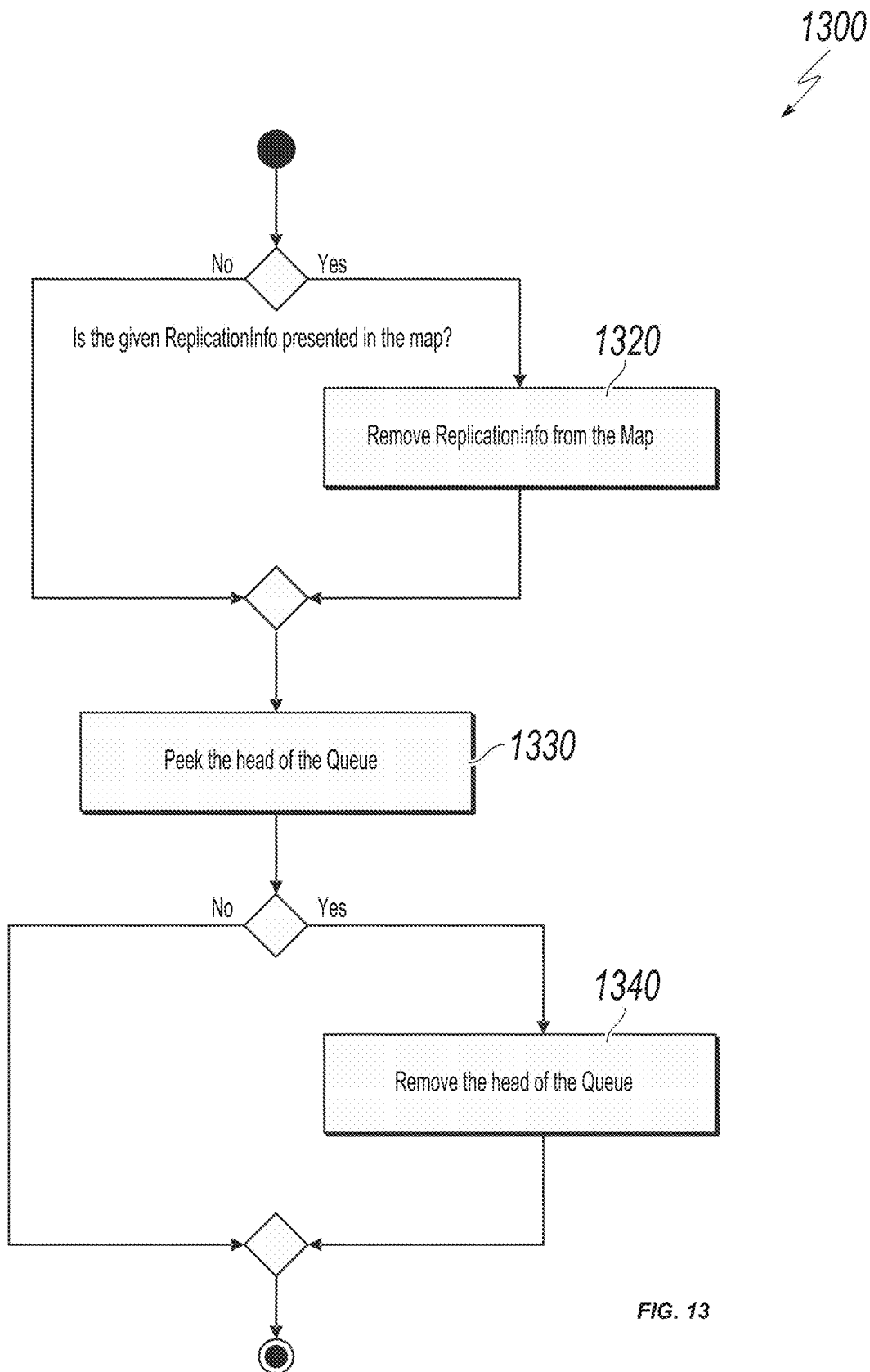
FIG. 13 is a block diagram for an example method for executing a remove operation on a queue data structure maintained at an in-memory data grid at an instance of a storage service in accordance with implementations of the present disclosure.

FIG. 13 is a block diagram for an example method 1300 for executing a remove operation on a queue data structure maintained at an in-memory data grid at an instance of a storage service in accordance with implementations of the present disclosure. In some instances, the map of the in-memory data grid can correspond to the map 760 of the in-memory data grid 710 of FIG. 7. In some instances, when the remove operation is executed on the queue data structure, the remove operation deletes a replication metadata object including metadata for the file for replication at the queue data structure and an element at the map that corresponds to the replication metadata object. The replication metadata object can include metadata for the file that can be used to execute the replication. In some instances, the map includes value pairs that include as key a path for the file to be replicated and as value the replication metadata object that is correspondingly stored in a queue data structure at the in-memory data grid including data for the operation executed in association with storing the file (e.g., type of operation such as upload or delete, time stamp, others). In some instances, the removal of records from both the map and the queue data structure can be performed in response to execution of replications for the associated file with the objects (elements) in the structures of the in-memory data grid.

In some instances, the remove operation accepts as input a replication metadata object associated with a file, and performed operation to delete a corresponding element from the map and the replication metadata object from the queue data structure.

At 1310, it is determined whether there is a replication metadata object for a given file that is associated with an element in the map, where the file has been replicated asynchronously.

If it is determined that there is a replication metadata object, method 1300 continues at 1320, where the corresponding element in the map is removed from the map. The method 1300 then continues at 1330.

If it is determined that there is no replication metadata object for a given file in the map, then method 1300 continues to 1330, where the queue data structure is peeked (according to the peek operation as described in FIG. 12) to determine a head element of the queue data structure. If the peeked element from the queue data structure is equal to the metadata object (that is provided as input for the replication) to the remove operation, the head element of the queue data structure is removed (at 1340). Otherwise, no actions for removal of elements in the data structure of the in-memory data grid may be necessary to be performed, and method 1300 can end.

Figure 14:
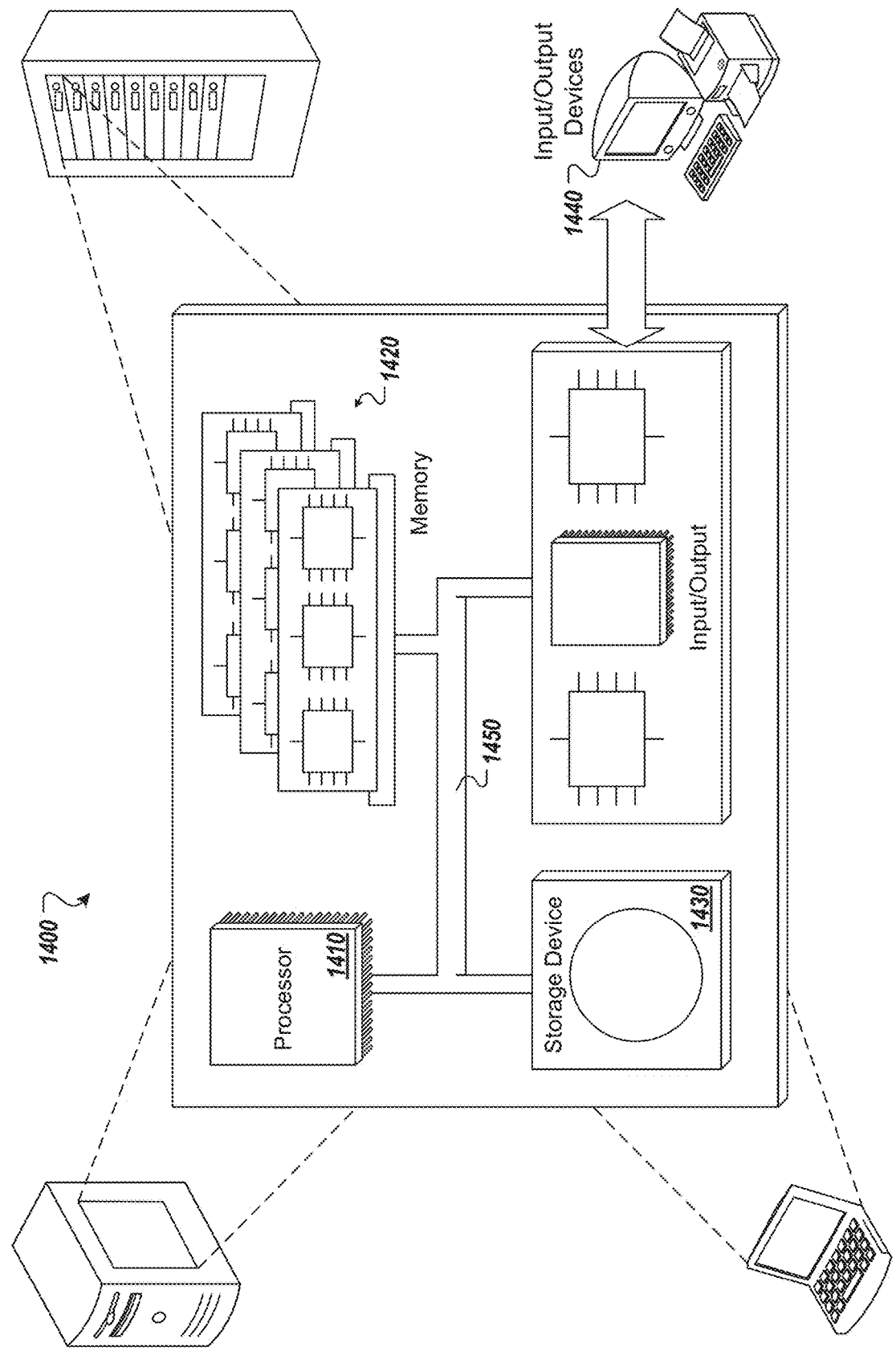
FIG. 14 is a schematic illustration of example computer systems that can be used to execute implementations of the present disclosure.

Referring now to FIG. 14, a schematic diagram of an example computing system 1400 is provided. The system 1400 can be used for the operations described in association with the implementations described herein. For example, the system 1400 may be included in any or all of the server components discussed herein. The system 1400 includes a processor 1410, a memory 1420, a storage device 1430, and an input/output device 1440. The components 1410, 1420, 1430, and 1440 are interconnected using a system bus 1450. The processor 1410 is capable of processing instructions for execution within the system 1400. In some implementations, the processor 1410 is a single-threaded processor. In some implementations, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In some implementations, the memory 1420 is a computer-readable medium. In some implementations, the memory 1420 is a volatile memory unit. In some implementations, the memory 1420 is a non-volatile memory unit. The storage device 1430 is capable of providing mass storage for the system 1400. In some implementations, the storage device 1430 is a computer-readable medium. In some implementations, the storage device 1430 may be a floppy disk device, a hard disk device, an optical disk device, or a tape device. The input/output device 1440 provides input/output operations for the system 1400. In some implementations, the input/output device 1440 includes a keyboard and/or pointing device. In some implementations, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Examples

Although the present application is defined in the attached claims, it should be understood that the present invention can also (alternatively) defined in accordance with the following examples:

Real-Time Data Replication in a Multiple Availability Zone Cloud Platform

Example 1. A computer-implemented method for managing data replication in a multiple availability zone cloud environment, the method comprising:

receiving a request associated with storing content of a file at a storage service provided by a multiple availability zone cloud platform;

in response to receiving the request, sending a lock request through a persistence interface to an in-memory data grid at a first instance of the storage service to lock the file for accessing;

receiving, at the persistence interface, an input stream including the content of the file based on the request, wherein receiving the input stream includes:
- iteratively reading the input stream in portions; and
- iteratively storing, by the persistence interface, a read portion for the file in a first file system storage associated with instances of the storage service at a first availability zone, wherein during storing the read portion, the file is locked for accessing;

in response to storing a portion of the file, providing, through the persistence interface, the stored portion of the file to a replication executor at the first instance of the storage service, wherein each portion is provided to the replication executor to request replication of read and stored portions of the content of the file from the input stream into a second file storage of a second availability zone of the multiple availability zone cloud platform;

determining a mode of replication for executing transfer of portions of the input stream from the replication executor at the first instance of the storage service running at the first availability zone to a replication interface at a second instance of the storage service running at the second availability zone; and in response to determining that the mode of replication is synchronous, providing, by the replication executor, a request to store a stored portion of the input stream by the persistence interface of the first instance of the storage service at the first availability zone to the replication interface of the second instance of the storage service, wherein the request is to store the read and stored portion at the second file storage of the second availability zone.

Example 2. The method of Example 1, wherein the request is from a user, and wherein the request is received at the persistence interface instantiated at the first instance of the storage service, wherein the first instance of the storage service is running at the first availability zone of the multiple availability zone cloud platform, wherein the user is associated with instances running at the first availability zone as primary storage service instances, wherein the multiple availability zone cloud platform includes at least two availability zones, where the storage service is executed with at least two instances at each of the availability zones, and wherein the storage service provides bi-directional replication between instances running at the multiple availability zones to maintain synchronized content at corresponding file storages.

Example 3. The method of any one of the preceding Examples, wherein storing content includes at least one of adding, updating, modifying of content of the file.

Example 4. The method of any one of the preceding Examples, further comprising:
receiving a delete request associated with the file at a first instance of the storage service provided at the first availability zone of the multiple availability zone cloud platform;
in response to receiving the delete request,
sending a lock request through the persistence interface to the in-memory data grid at the first instance of the storage service to lock the file for accessing;
sending an instruction for execution of a delete operation to delete the file at the first file storage; and
sending a request, by the replication executor, to the replication interface of the second instance of the storage service at the second availability zone to delete the file at the second file storage; and
in response to determining that deleting at the second file storage is executed successfully, sending a delete request to the in-memory data grid at the first instance of the storage service to delete metadata stored for the file.

Example 5. The method of any one of the preceding Examples, wherein the stored portion of the file is provided to the replication executor for replication at the second availability zone in parallel to reading a subsequent portion of the input stream by the persistence interface.

Example 6. The method of any one of the preceding Examples, wherein the persistence interface is an application programming interface (API) implemented at the first instance of the storage service, and wherein the request is dispatched for receiving by the first instance of the storage service based on load balancing rules defined for the multiple availability zone cloud platform.

Example 7. The method of any one of the preceding Examples, further comprising:
in response to determining that the mode of replication is synchronous on each iteration, providing iteratively each of the portions of the input stream to the replication interface of the second instance of the storage service to replicate the stored content at the first file storage of the first availability zone to the second file storage of the second availability zone.

Example 8. The method of any one of the preceding Examples, further comprising:
in response to determining that a provided portion for replication at the second file storage failed to be replicated:
configuring an asynchronous mode of replication for a subsequent iteration for data transfer from the first instance of the storage service at the first availability zone; and
reading and storing subsequent portions of the file to store the content of the file at the first file storage at the first availability zone; and
storing metadata for the file that is stored at the first file storage at the first availability zone, wherein the metadata is stored at the in-memory data grid of the first instance of the storage service, wherein the in-memory data grid of the first instance of the storage service is synchronized with in-memory data grids at other instances of the storage service running at the multiple availability zones cloud platform.

Example 9. The method of Example 8, further comprising:
in response to determining that the mode of replication is changed to synchronous from a previous asynchronous mode:
reading the stored metadata for the file;
locking the file for accessing by creating a lock record for the file at the in-memory data grid at the first instance of the storage service;
reading the stored file at the first file storage; and
replicating the file at the second file storage at the second availability zone by providing the file to the replication interface of the second instance of the storage service at the second availability zone,
wherein the mode of replication is changed to synchronous mode in response to successful replication of at least a portion of stored changes for replication during the asynchronous mode.

Example 10. The method of any one of the preceding Examples, wherein the in-memory data grid stores the metadata in a queue data structure, where data from the data grid is read in a first-in-first-out mode.

Asynchronous Data Replication in a Multiple Availability Zone Cloud Platform

Example 1. A computer-implemented method for managing asynchronous data replication in a multiple availability zone cloud environment, the method comprising:

storing metadata for one or more files for asynchronous replication at a second availability zone, wherein the metadata is stored at an in-memory data grid of a first instance of a storage service at a first availability zone, wherein the first and the second availability zones are included in a multiple availability cloud platform providing storage services, wherein the in-memory data grid includes a queue data structure of metadata records and a map of metadata records, wherein the queue data structure includes one or more records corresponding to one or more operations executed on a file to define versions of the file from the one or more files for replication from the first availability zone to the second availability zone, wherein a record from the queue data structure includes metadata for a corresponding request for storing content for a file, and wherein the map of metadata records identifies the files that are associated with requests for storing content that are not replicated at the second availability zone of a multiple availability zone cloud platform; and in response to determining that connection from the first availability zone to the second availability zone is available, executing asynchronous data replication for files identified at the map, wherein the execution includes:

determining a file for replication that is identified at the map;

reading the stored metadata for the file for replication from the queue data structure to determine a replication operation based on one or more records identified for the file for replication at the queue data structure;

reading, by a replication executor at the first instance of the storage service, the file from a first file storage; and providing for replication, by the replication executor at the first instance of the storage service, the file at a second file storage at the second availability zone by providing the file to a replication interface of a second instance of the storage service at the second availability zone.

Example 2. The method of Example 1, wherein in response to determining the file for replication, locking the file for accessing by creating a lock record for the file at the in-memory data grid at the first instance of the storage service.

Example 3. The method of any one of the preceding Examples, wherein the one or more files for replication include a file that is received at a first instance of a storage service at the first availability zone.

Example 4. The method of any one of the preceding Examples, wherein the replication is determined to be performed asynchronously at a replication agent included in the replication executor based on evaluation of metadata stored at the in-memory data grid.

Example 5. The method of any one of the preceding Examples, wherein metadata stored at the in-memory data grid is read iteratively to determine a record from the records stored at the queue and associated with a file for replication, wherein the record corresponds to the replication operation to be executed for the asynchronous data replication of the file.

Example 6. The method of any one of the preceding Examples, wherein the replication of the file by the replication executor is performed in portions read from the file from the first file storage and stored in portions at the second file storage at the second availability zone.

Example 7. The method of any one of the preceding Examples, wherein the metadata stored in the in-memory data grid is updated iteratively while evaluating the data to determine the replication operation to be executed.

Example 8. The method of any one of the preceding Examples, wherein the one or more operations includes an operation of an operation type selected from the group of adding, updating, modifying, and deleting of the file, and wherein a version of a file corresponds to an operation type.

What is claimed is:

1. A computer-implemented method for managing asynchronous data replication in a multiple availability zone cloud environment, the method comprising:

storing metadata for one or more files for the asynchronous data replication from a first availability zone to a second availability zone of the multiple availability zone cloud environment, wherein the metadata is stored at an in-memory data grid of a first instance of a storage service at the first availability zone of the multiple availability zone cloud environment, wherein the in-memory data grid includes a queue data structure of metadata records and a map of metadata records, wherein the queue data structure includes one or more records corresponding to one or more operations executed on a first file from the one or more files for the asynchronous data replication, wherein the first file is stored at a first file storage at the first availability zone, wherein the one or more records corresponding to the first file are associated with one or more respective versions of the first file created based on the one or more operations to store content for the first file based on received requests for the first file at the first file storage, and wherein the map of metadata records identifies the files that are to be replicated and includes information for a request associated with a latest operation performed on each of the files; and in response to determining that a connection from the first availability zone to the second availability zone is available, executing the asynchronous data replication for the first file identified at the map, wherein the execution includes:

determining the first file for replication that is identified at the map;

reading the stored metadata for the first file for replication from the queue data structure to determine a replication operation based on the one or more records identified for the first file at the queue data structure and at the map, wherein the stored metadata is read iteratively until a record from the one or more records stored at the queue for the first file for replication is determined to match information for the first file at the map, wherein the replication operation is determined to correspond to a latest operation performed on the first file as included in the information for the first file at the map;

reading, by a replication executor at the first instance of the storage service, the first file from the first file storage; and providing a replication operation for executing replication by the replication executor at the first instance of the storage service, wherein the first file is replicated at a second file storage at the second availability zone by providing the first file to a replication interface of a second instance of the storage service at the second availability zone.

2. The method of claim 1, wherein in response to determining the first file for replication, locking the first file for accessing by creating a lock record for the file at the in-memory data grid at the first instance of the storage service.

3. The method of claim 1, wherein the one or more files for replication include a file that is received at a first instance of a storage service at the first availability zone.

4. The method of claim 1, wherein the replication is determined to be performed asynchronously at a replication agent included in the replication executor based on evaluation of metadata stored at the in-memory data grid.

5. The method of claim 1, wherein the replication of the first file by the replication executor is performed in portions read from the first file from the first file storage and stored in portions at the second file storage at the second availability zone.

6. The method of claim 1, wherein the metadata stored in the in-memory data grid is updated iteratively while evaluating the data to determine the replication operation to be executed.

7. The method of claim 1, wherein the one or more operations includes an operation of an operation type selected from the group of adding, updating, modifying, and deleting of the file, and wherein a version of the first file corresponds to an operation type.

8. A non-transitory, computer-readable medium coupled to one or more processors and having instructions stored thereon which, when executed by the one or more processors, cause the one or more processors to perform operations, the operations comprising:
  storing metadata for one or more files for the asynchronous data replication from a first availability zone to a second availability zone of the multiple availability zone cloud environment, wherein the metadata is stored at an in-memory data grid of a first instance of a storage service at the first availability zone of the multiple availability zone cloud environment, wherein the in-memory data grid includes a queue data structure of metadata records and a map of metadata records, wherein the queue data structure includes one or more records corresponding to one or more operations executed on a first file from the one or more files for the asynchronous data replication, wherein the first file is stored at a first file storage at the first availability zone, wherein the one or more records corresponding to the first file are associated with one or more respective versions of the first file created based on the one or more operations to store content for the first file based on received requests for the first file at the first file storage, and wherein the map of metadata records identifies the files that are to be replicated and includes information for a request associated with a latest operation performed on each of the files; and
  in response to determining that a connection from the first availability zone to the second availability zone is available, executing the asynchronous data replication for the first file identified at the map, wherein the execution includes:
    determining the first file for replication that is identified at the map;
    reading the stored metadata for the first file for replication from the queue data structure to determine a replication operation based on the one or more records identified for the first file at the queue data structure and at the map, wherein the stored metadata is read iteratively until a record from the one or more records stored at the queue for the first file for replication is determined to match information for the first file at the map, wherein the replication operation is determined to correspond to a latest operation performed on the first file as included in the information for the first file at the map;
    reading, by a replication executor at the first instance of the storage service, the first file from the first file storage; and
  providing a replication operation for executing replication by the replication executor at the first instance of the storage service, wherein the first file is replicated at a second file storage at the second availability zone by providing the first file to a replication interface of a second instance of the storage service at the second availability zone.

9. The computer-readable medium of claim 8, wherein in response to determining the first file for replication, locking the first file for accessing by creating a lock record for the file at the in-memory data grid at the first instance of the storage service.

10. The computer-readable medium of claim 8, wherein the replication is determined to be performed asynchronously at a replication agent included in the replication executor based on evaluation of metadata stored at the in-memory data grid.

11. The computer-readable medium of claim 8, wherein the replication of the first file by the replication executor is performed in portions read from the first file from the first file storage and stored in portions at the second file storage at the second availability zone, wherein the metadata stored in the in-memory data grid is updated iteratively while evaluating the data to determine the replication operation to be executed.

12. The computer-readable medium of claim 8, wherein the one or more operations includes an operation of an operation type selected from the group of adding, updating, modifying, and deleting of the file, and wherein a version of the first file corresponds to an operation type.

13. A system comprising
  a computing device; and
  a computer-readable storage device coupled to the computing device and having instructions stored thereon which, when executed by the computing device, cause the computing device to perform operations, the operations comprising:
    storing metadata for one or more files for the asynchronous data replication from a first availability zone to a second availability zone of the multiple availability zone cloud environment, wherein the metadata is stored at an in-memory data grid of a first instance of a storage service at the first availability zone of the multiple availability zone cloud environment, wherein the in-memory data grid includes a queue data structure of metadata records and a map of metadata records, wherein the queue data structure includes one or more records corresponding to one or more operations executed on a first file from the one or more files for the asynchronous data replication, wherein the first file is stored at a first file storage at the first availability zone, wherein the one or more records corresponding to the first file are associated with one or more respective versions of the first file created based on the one or more operations to store content for the first file based on received requests for the first file at the first file storage, and wherein the map of metadata records identifies the files that are to be replicated and includes information for a request associated with a latest operation performed on each of the files; and in response to determining that a connection from the first availability zone to the second availability zone is available, executing the asynchronous data replication for the first file identified at the map, wherein the execution includes:
  determining the first file for replication that is identified at the map;
  reading the stored metadata for the first file for replication from the queue data structure to determine a replication operation based on the one or more records identified for the first file at the queue data structure and at the map, wherein the stored metadata is read iteratively until a record from the one or more records stored at the queue for the first file for replication is determined to match information for the first file at the map, wherein the replication operation is determined to correspond to a latest operation performed on the first file as included in the information for the first file at the map;
  reading, by a replication executor at the first instance of the storage service, the first file from the first file storage; and
  providing a replication operation for executing replication by the replication executor at the first instance of the storage service, wherein the first file is replicated at a second file storage at the second availability zone by providing the first file to a replication interface of a second instance of the storage service at the second availability zone.

14. The system of claim 13, wherein in response to determining the first file for replication, locking the first file for accessing by creating a lock record for the file at the in-memory data grid at the first instance of the storage service.

15. The system of claim 13, wherein the replication is determined to be performed asynchronously at a replication agent included in the replication executor based on evaluation of metadata stored at the in-memory data grid.

16. The system of claim 13, wherein the replication of the first file by the replication executor is performed in portions read from the first file from the first file storage and stored in portions at the second file storage at the second availability zone, wherein the metadata stored in the in-memory data grid is updated iteratively while evaluating the data to determine the replication operation to be executed.

17. The system of claim 13, wherein the one or more operations includes an operation of an operation type selected from the group of adding, updating, modifying, and deleting of the file, and wherein a version of the first file corresponds to an operation type.

* * * * *